(12) United States Patent
Proffitt et al.

(10) Patent No.: US 7,093,525 B2
(45) Date of Patent: Aug. 22, 2006

(54) CHIPLESS TRIMMING OF PLASTIC BOTTLES

(75) Inventors: James R. Proffitt, Oregon, OH (US); Michael J. Kelly, Toledo, OH (US); Peter J. Hatas, Sylvania, OH (US)

(73) Assignee: Autotech, Inc., Toledo, OH (US)

( * ) Notice: Subject to any disclaimer, the term of this patent is extended or adjusted under 35 U.S.C. 154(b) by 331 days.

(21) Appl. No.: 10/422,004

(22) Filed: Apr. 23, 2003

(65) Prior Publication Data
US 2004/0050220 A1 Mar. 18, 2004

Related U.S. Application Data

(60) Provisional application No. 60/410,469, filed on Sep. 13, 2002.

(51) Int. Cl.
*B23B 1/00* (2006.01)
*B23B 5/14* (2006.01)

(52) U.S. Cl. ............... 82/46; 82/47; 82/70.2; 82/83; 82/10.1

(58) Field of Classification Search ............ 82/46, 82/47, 54, 61, 70.1, 70.2, 72, 83, 93, 101
See application file for complete search history.

(56) References Cited

U.S. PATENT DOCUMENTS

| | | | |
|---|---|---|---|
| 3,429,211 A * | 2/1969 | Pelot | 82/46 |
| 3,675,521 A * | 7/1972 | Ziegler | 82/101 |
| 3,886,824 A * | 6/1975 | Michel et al. | 82/47 |
| 3,962,938 A | 6/1976 | Reilly et al. | |
| 3,967,516 A | 7/1976 | Griesing et al. | |
| 4,046,038 A | 9/1977 | West | |
| 4,445,406 A * | 5/1984 | Thatcher | 82/46 |
| 4,538,489 A | 9/1985 | Takano | |
| 4,557,167 A | 12/1985 | Cvacho | |
| 4,671,148 A | 6/1987 | Thatcher | |
| 4,782,728 A | 11/1988 | Thatcher | |
| 4,876,930 A * | 10/1989 | Thatcher | 82/46 |
| 4,982,635 A | 1/1991 | Thatcher | |
| 4,995,286 A | 2/1991 | Kobayashi et al. | |
| 5,167,968 A | 12/1992 | Dunlap et al. | |
| 5,257,560 A * | 11/1993 | Palazzolo | 82/46 |
| 5,603,249 A | 2/1997 | Weber et al. | |
| 5,617,768 A | 4/1997 | Palazzolo | |
| 5,664,471 A | 9/1997 | Dundas | |
| 5,725,309 A * | 3/1998 | Robinson | 383/7 |
| 5,749,275 A | 5/1998 | Dundas et al. | |
| 5,787,772 A | 8/1998 | Weber et al. | |
| 5,791,217 A * | 8/1998 | Dundas et al. | 83/13 |
| 6,375,890 B1 * | 4/2002 | Salemi | 264/523 |

* cited by examiner

*Primary Examiner*—Willmon Fridie, Jr.
(74) *Attorney, Agent, or Firm*—Emch, Schaffer, Schaub & Porcello Co., L.P.A.

(57) ABSTRACT

Method and apparatus for trimming the neck of plastic bottles includes means for rapidly rotating a cutting blade around the neck being trimmed while progressively moving the cutting blade through the thickness of the neck. During the cutting, a flat surface of the cutting blade rubs against the newly cut upper neck or finish surface to provide a polished surface therefor.

32 Claims, 26 Drawing Sheets

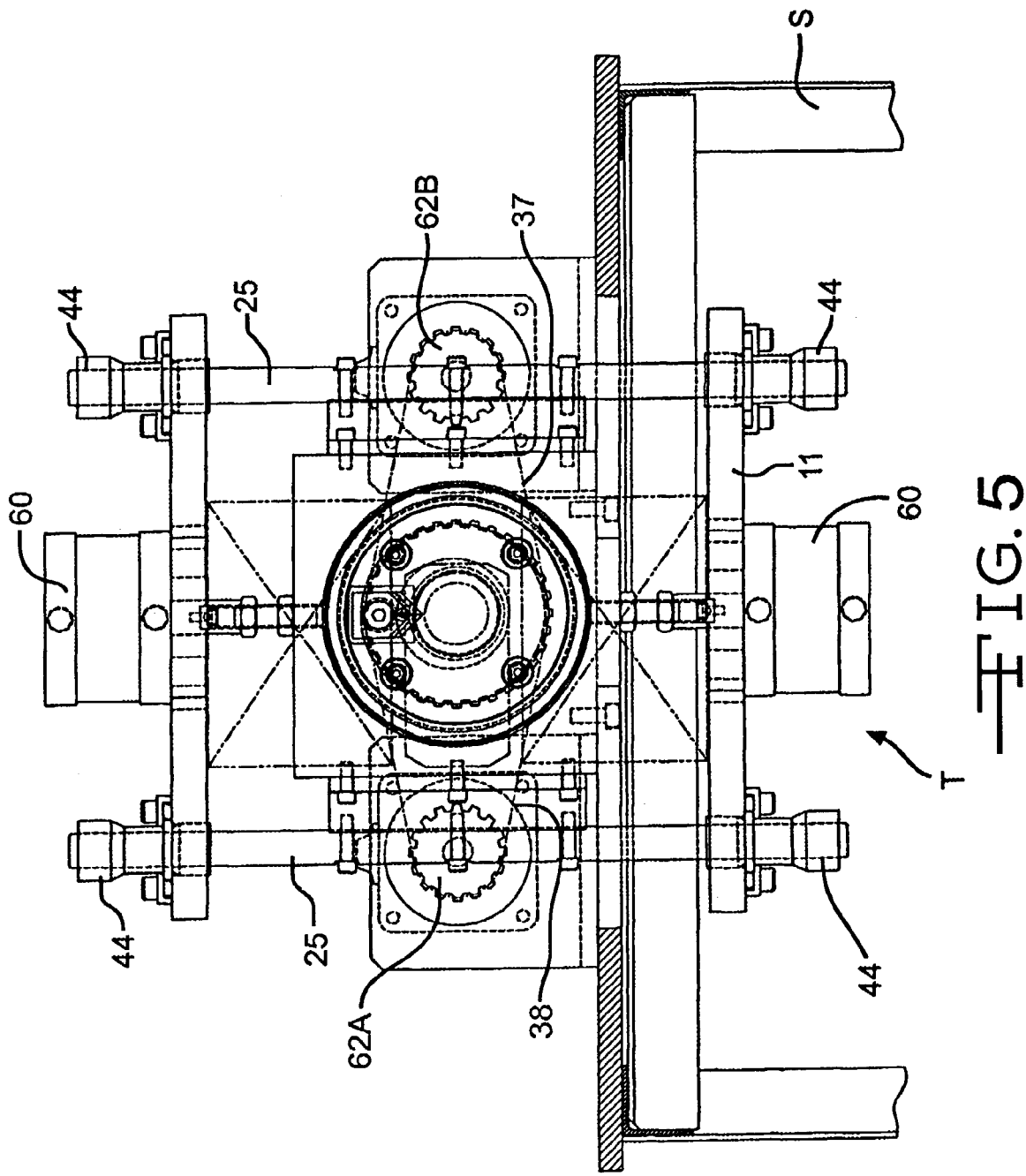

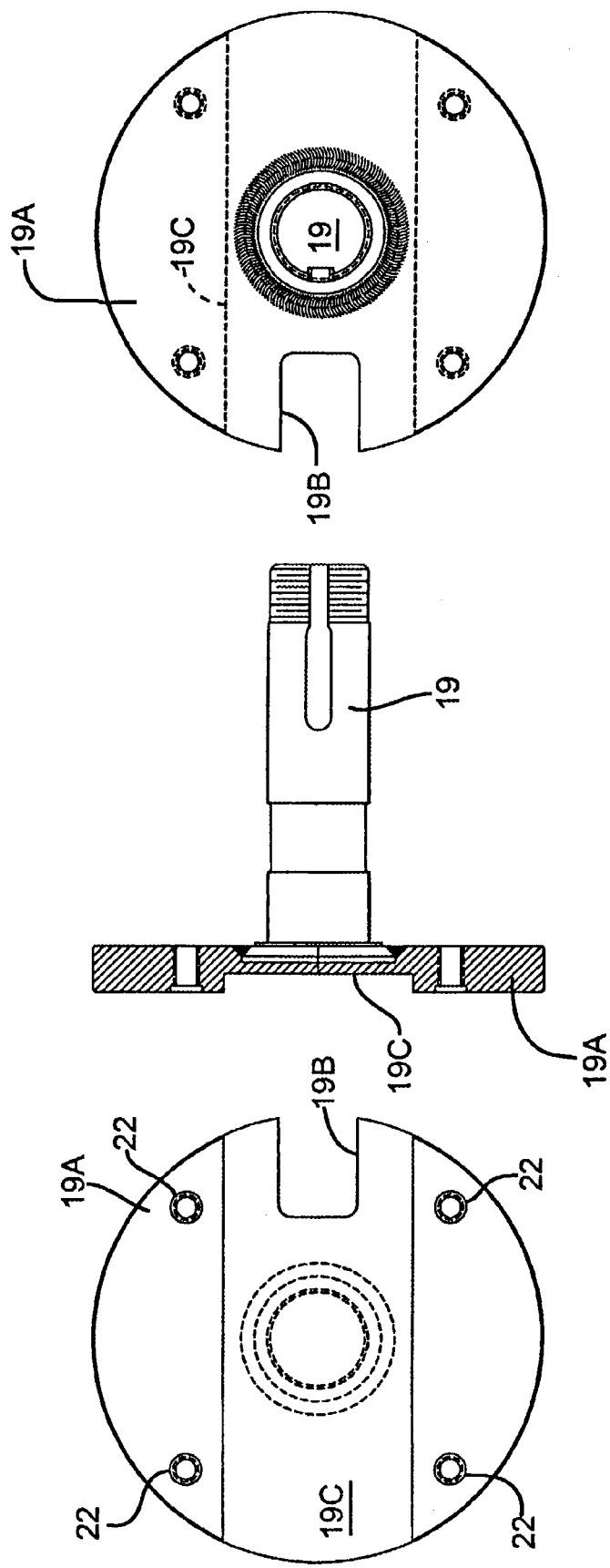

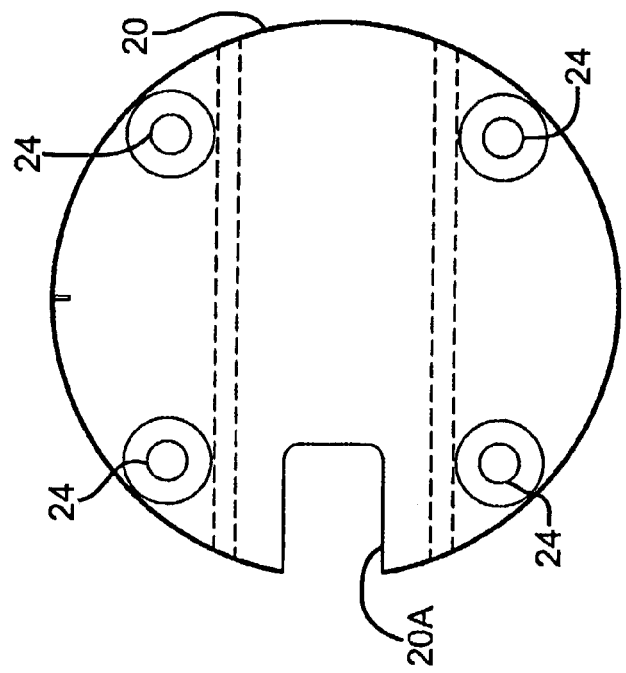
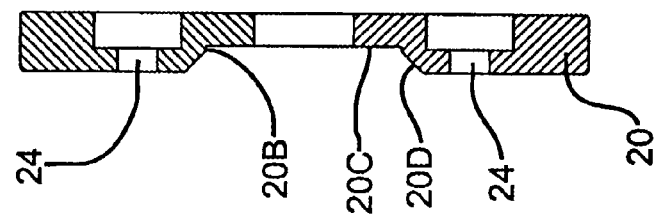
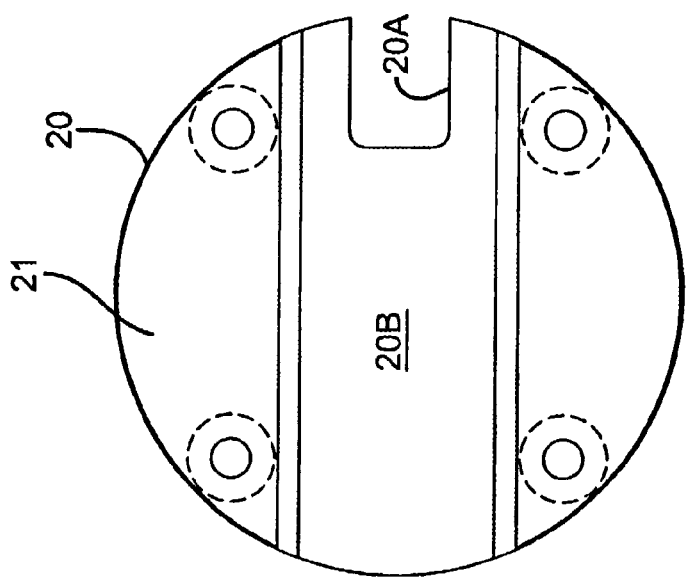
FIG. 14B
FIG. 14A
FIG. 14C

CHIPLESS TRIMMING OF PLASTIC BOTTLES

RELATED PRIOR APPLICATIONS

This application is based upon and claims the benefit of U.S. Provisional Patent Application Ser. No. 60/410,469 filed Sep. 13, 2002.

BACKGROUND OF THE INVENTION

The present invention is directed to a method and apparatus for trimming plastic bottles, particularly the neck portions thereof, without generating undesirable chips, slivers or other undesirable waste fragments. Prior art machines for cutting the extended or waste portion of plastic bottles have had significant problems. These problems have included a lack of consistent cutting which causes inconsistent cuts, under cuts, slivers as well as tails and other extended portions of plastic not fully removed from the neck finish of the bottle. Additionally, it is desirable that the newly cut surface forming the finish portion of the bottle (i.e. the upper surface of the neck which is engaged by the top panel of a closure applied thereto) be smooth, flat and lie in a plane perpendicular to the axis of the neck.

SUMMARY OF THE INVENTION

The apparatus includes a cradle for initially supporting the lower portion of the bottle in a position in which the axis of the bottle neck is slightly below the axis of such neck during trimming. In automatic operation the cradle is a series of buckets attached to a chain. Each bucket grasps and supports the lower portion of the bottle while moving it into position to have its neck engaged and supported by neck clamps. The neck of the bottle to be trimmed extends beyond the forward edge of the cradle or bucket in a position to be engaged by upper and lower bottle neck clamps. During the operation of neck clamping, the bottle neck is elevated relative to the cradle and the bottle is supported by upper and lower neck clamps closed around the neck. With the bottle or container thus clamped between the upper and lower bottle neck clamps, excess or waste plastic extending from the molded neck extends axially outward from the closed bottle neck clamps. Such excess or waste portion of plastic, following its removal by the trimming operation, may be referred to as the "moil."

The trimming operation may utilize either a single revolution in which the moil is removed with a single revolution of the cutting blade passing circumferentially therearound while penetrating through the full thickness of the neck wall or with multiple revolutions of the cutting blade. In the multiple revolution cutting embodiment, a cam and servo controlled drive system is provided to progressively move the blade deeper into and through the neck wall as the blade is rotated around the neck until it completely penetrates the wall thickness, thereby severing the moil from the neck finish. In the multiple revolution cutting embodiment, the blade may be moved deeper into the thickness of the neck wall being trimmed on either a continuous or an incremental basis.

The present invention also permits self-sharpening of the cutting blade and utilization of the cutting blade to provide a polished finish on the newly cut surface forming the upper edge or finish of the neck. A polished finish is especially effective in achieving a leak-proof seal with a closure secured to the neck.

The upper and lower bottle neck clamps have neck engaging recesses contoured to snugly engage the neck, including the threads or other closure receiving means, of the bottle being trimmed and to support the neck during trimming with the cutting blade to form a finish which is perpendicular to the axis of the neck and which has good planarity (i.e. is flat). A significant feature in achieving this superior quality of finish is a guide surface on each of the neck clamps which is perpendicular to the axis of the neck engaging recess defined by the closed upper and lower bottle neck clamps lying in a plane co-planar with the finish formed during the cutting operation. The cutting blade rubs against the guide surface as it is moved inwardly toward and outwardly from the axis during the cutting operation. The guide surface is formed of a material such as bearing bronze or steel alloy which serves to sharpen the cutting edge of the cutting blade as it moves along such guide surface. Although the cutting edge could be curved or taper to a point, it is preferred that cutting blade incorporate a straight edge. The feature of a cutting edge being straight has the advantages of (1) ensuring consistent location of the cutting edge in the partial cut made during previous revolutions of the cutting edge around the neck being cut, (2) providing a larger abrasive surface on the cutting blade to rub against and polish the finish during cutting, and (3) incorporating a larger contact area for supporting the cutting blade as it rotates across the guide surface.

BRIEF DESCRIPTION OF THE DRAWINGS

FIG. 5 is a front elevational view of the trimmer apparatus of the present invention.

FIG. 13A is an elevational view, partly in section of the cutting shaft.

FIG. 13B is an end view of the cutting shaft.

FIG. 13C is an end view of the cutting shaft taken from the opposite side of FIG. 13B.

FIG. 14A is a sectional view of the blade slide retainer.

FIG. 14B is an end view of that side of the blade slide retainer facing the cutting shaft.

FIG. 14C is an end view of the opposite side of FIG. 14B.

DETAILED DESCRIPTION OF THE INVENTION

Figure 1A:
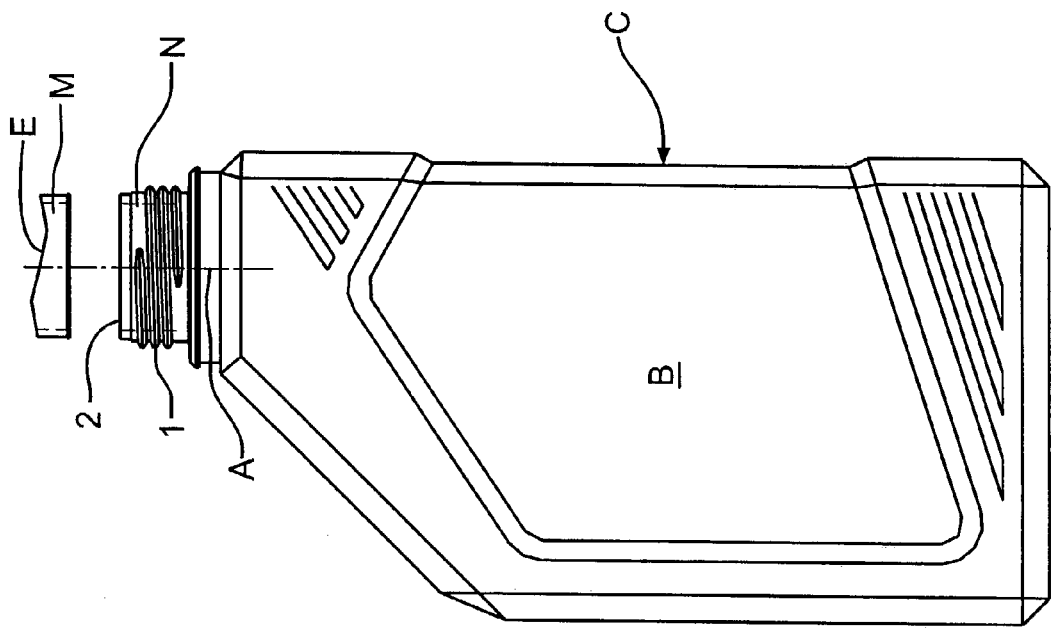
FIGS. 1A and 1B are elevational views of a bottle or container before trimming (FIG. 1A) and after trimming (FIG. 1B).
Figure 1B:
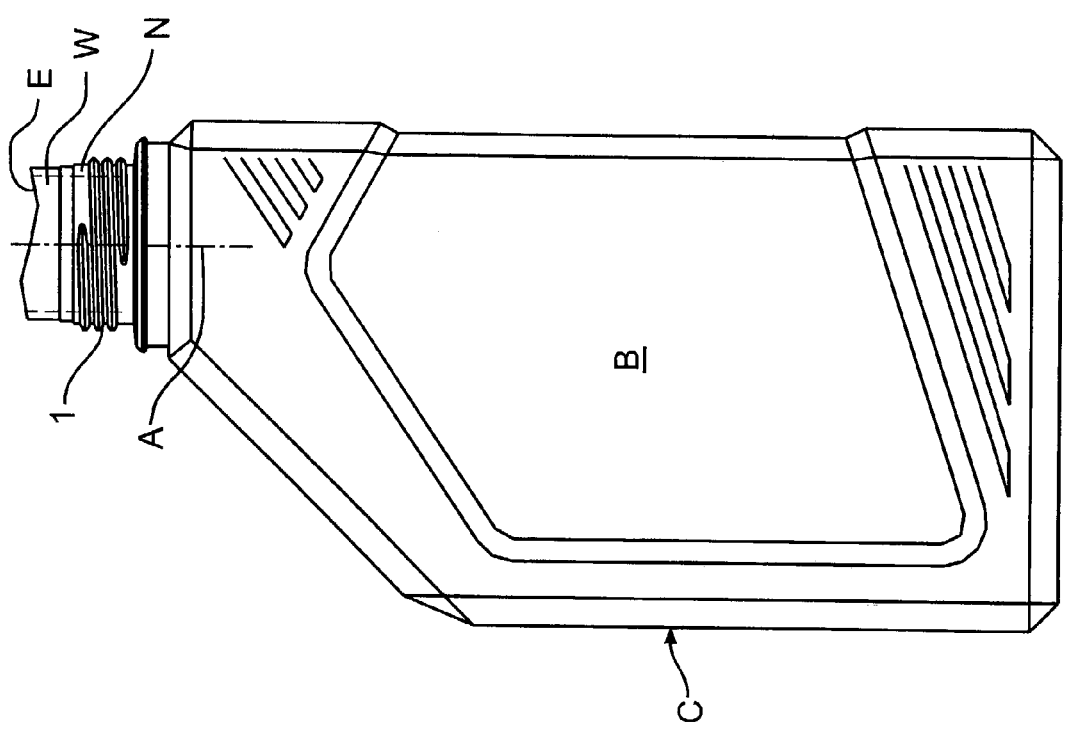

Referring to the drawings, there is shown in FIG. 1A, a container C before trimming with the chipless trimmer of the present invention and in FIG. 1B, the container designated by the letter C' after trimming with the chipless trimmer of the present invention. The container C before trimming has been blow molded or otherwise molded with a body portion B and a neck portion N having threads 1 for receiving a threaded closure and an excess waste portion W of plastic to be trimmed. As will be appreciated by those skilled in the art, it is important that the upper portion of the neck of the finished container C' be substantially flat and perpendicular to the axis A of the neck N in order to achieve a leak-proof seal between such closure and the container. In many types of plastic bottle manufacturing operations, however, the newly blown container C has an additional waste portion ("dome") of plastic (not shown) which is severed by a guillotine or simple stamping cut in which the knife passes through the plastic with straight-line motion. This type of cutting frequently leaves a wavy upper edge such as that shown by the letter E in FIG. 1A. Such wavy upper edge results from the resistance of the wall of the neck N to the straight-line guillotine motion of the cutting blade causing deformation of such wall. As a result, the guillotined cut edge E as shown in FIG. 1A will not be flat but rather will be wavy as shown in FIG. 1A. It is therefore necessary to remove such waste portion W and to do so in a way which will provide a flat upper end 2 as shown in FIG. 1B which may be sealingly engaged by a closure engaged to the threads 1 of the neck N.

The chipless trimmer of the present invention is intended to remove the waste portion W in order to provide a finished container C' having a flat upper end 2 or finish which is substantially perpendicular to the axis A and which can effect a leak-proof seal with a closure attached thereto. As shown in FIG. 1B, the portion removed by trimming to form the finished container C' is referred to as moil M.

Referring to FIGS. 5–12, there is shown a chipless trimmer T of the present invention mounted on support structure S. The trimmer T includes upper container tooling 27 and lower container tooling 28 for holding the container C as it is being trimmed. (See FIG. 7) Each of the upper and lower container tools 27, 28 includes a neck insert member 29 with a neck receiving recess 32 sized to snugly grip the neck N of the container C when the container tooling 27, 28 are in the closed position. The neck insert members 29 are precisely manufactured so that the neck receiving recesses 32 duplicate the detail of the neck design including recesses matching the threads or other closure retaining abutments. The upper container tooling 27 is also provided with a recess 33 having a contour shaped to receive the upper half of a small portion of the body B adjacent the neck N. Similarly, the lower container tooling support 28 is also provided with a recess 34 having a contour shaped to receive the lower half of a small portion of the body B adjacent the neck N. The upper and lower container tooling 27 and 28 are moveable between an open position shown in FIG. 7 to a closed position to encircle and support the neck N along axis A and a small adjacent portion of the body B while the neck N is being trimmed to remove the waste W.

Figure 7:
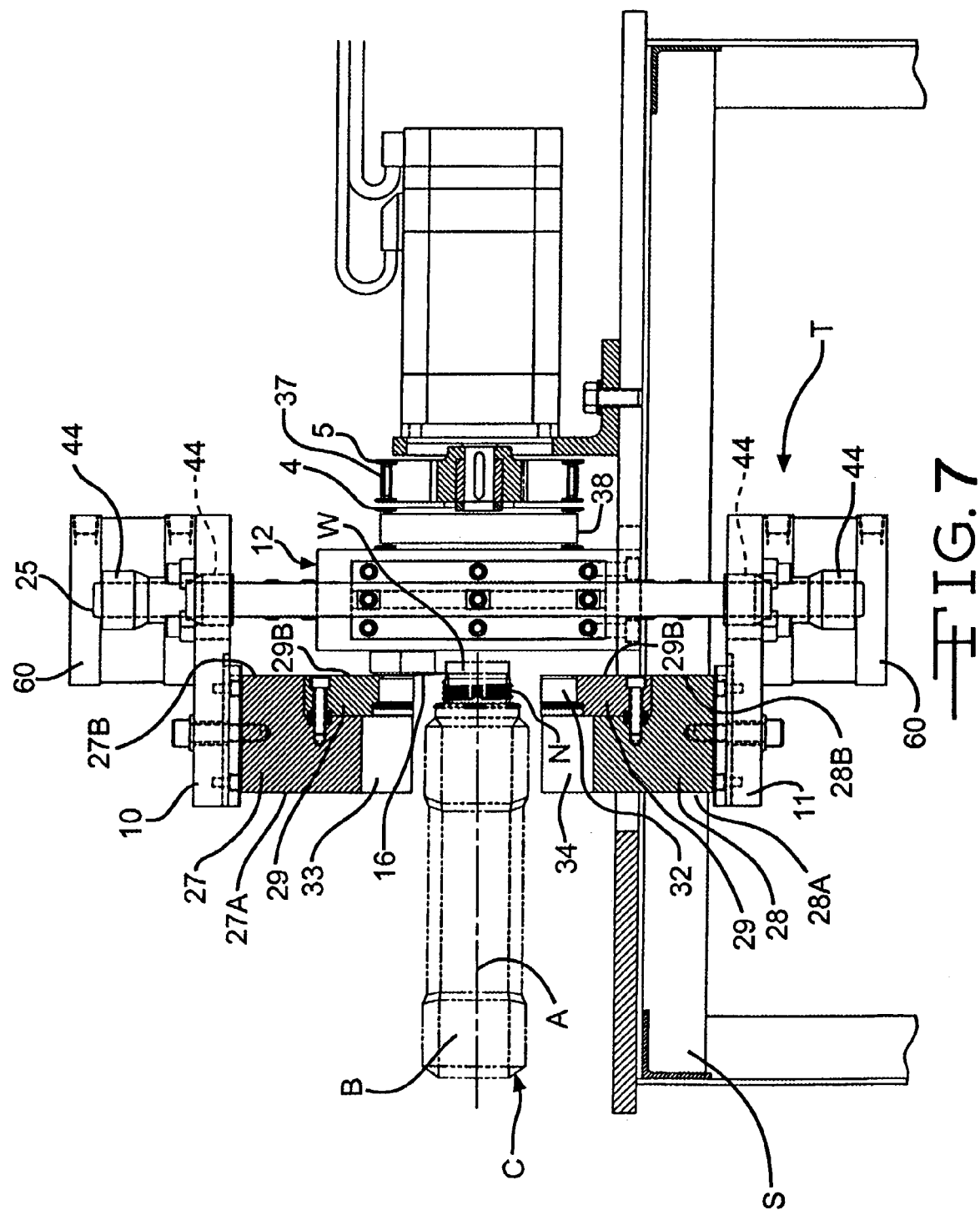
FIG. 7 is a side elevational view of the trimmer apparatus of the present invention.

The respective upper and lower container tooling 27, 28 each has a first side 27A and 28A, respectively, and a second side 27B and 28B spaced therefrom. The neck insert members 29 each has a wall 29B which is co-planar with second sides 27B and 28B. The neck insert members 29 may be formed of bearing bronze or, if desired, of a material such as a hardened steel alloy which has the capability of sharpening and polishing a knife or cutting blade surface which is rubbed thereagainst. As can be seen in FIG. 7, the waste W to be trimmed from the container C extends beyond the wall 29B of the neck insert members 29 so that it can be readily trimmed when the container C is supported between closed upper container tooling 27 and lower container tooling 28 with neck insert members 29 engaging the neck.

Figure 8:
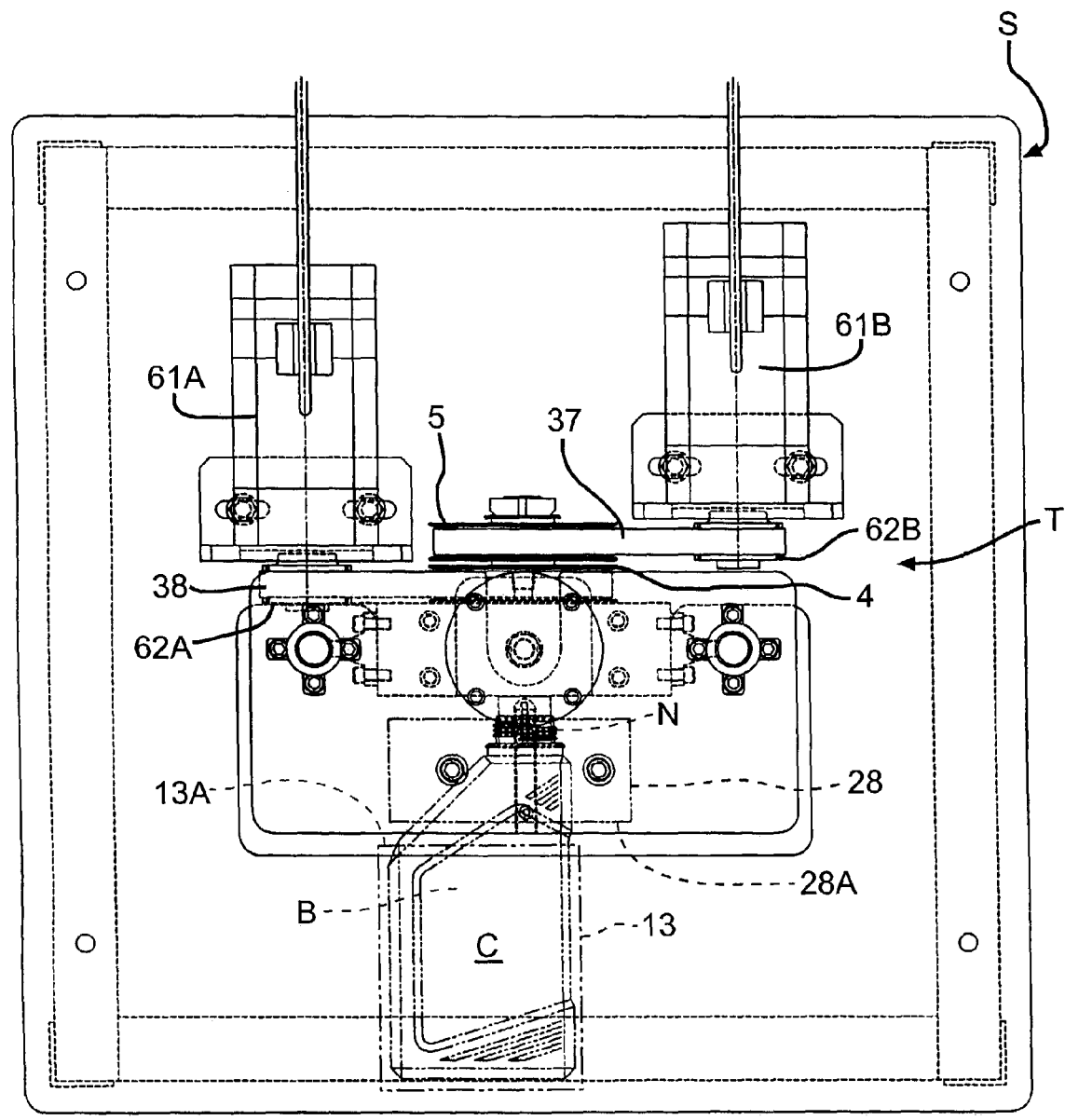
FIG. 8 is a top view of the trimmer apparatus of the present invention.

As may be seen in phantom lines in FIG. 8, there is also provided a cradle 13 having a recess contoured to receive and support approximately the lower ⅔ of the container C (i.e. the body B) prior to its engagement by the upper and lower container tooling 27, 28 and neck inserts 29. The cradle 13 includes an end 13A which is spaced laterally from the plane defined by the first side walls 27A and 28A of the respective upper and lower container tooling 27, 28. For a fully automated operation, a series of buckets may be used in lieu of the cradle 13 for supporting the lower portion of the container C.

Upper container tooling 27 and lower container tooling 28 are powered for movement between an open position shown in FIG. 7 to a closed position gripping and supporting the container C by means of air cylinders 60, one of which is connected to an upper platen 10 to which the upper container tooling 27 is secured and the other of which is connected to a lower platen 11 to which the lower container tooling 28 is secured. Movement of the upper platen 10 and lower platen 11 in response to actuation of the respective air cylinders 60 is guided by a pair of spaced apart guide shafts 25 each of which is supported in a pair of throughput bearings 44 mounted on the respective upper and lower platens 10, 11.

Mounted on the support structure S is a cutter support housing 12 for supporting the cutter assembly including a container cutting blade 16 and other portions of the cutting assembly to be hereinafter described (See FIG. 9). The housing 12 is positioned such that the cutting blade 16 is in contact with the wall 29B of the respective neck insert members 29 attached to the upper container tooling 27 and the lower container tooling 28. The cutting blade 16 is preferably tool steel which can be polished to a high degree and maintain a sharp cutting edge for extended periods.

Positioned within the cutter support housing 12 for rotation relative thereto is a cam shaft 18. Radial bearings 55 permit rotation of the cam shaft 18 relative to the cutter support housing 12. Rotation of the cam shaft 18 is effected by means of a timing pulley 4 secured to the cam shaft 18 by bolts 39. A drive belt 38 powers rotation of the timing pulley 4. The drive belt 38 is powered by a servo motor 61A having a drive pulley 62A over which the drive belt 38 is passed (see FIG. 8).

Figure 15B:
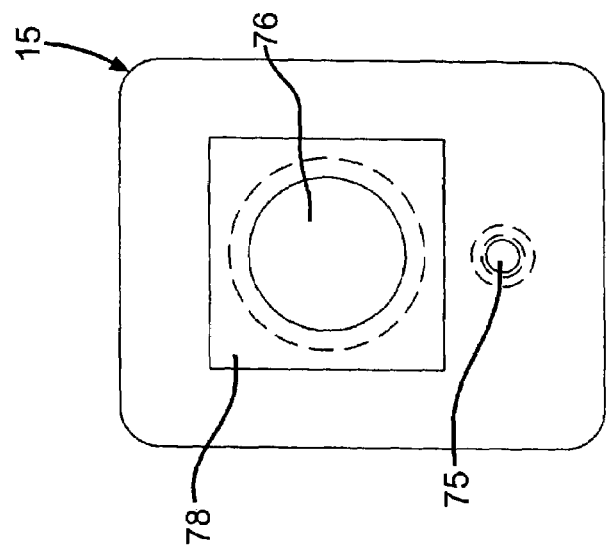
FIG. 15B is an end view of the cutting blade mount.
Figure 15A:
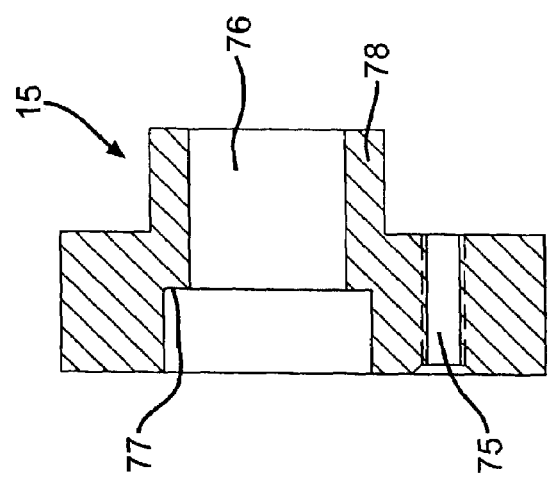
FIG. 15A is a sectional view of the cutting blade mount.
Figure 15C:
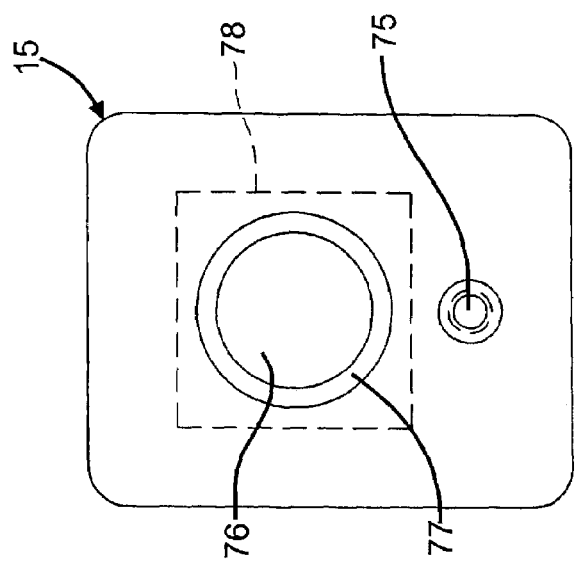
FIG. 15C is an end view of the cutting blade mount taken from the opposite side of FIG. 15B.

The cutting blade 16 is supported on a blade mount 15 by means of a screw 31. (See FIG. 9) The blade mount 15 has a generally rectangular cross-sectional configuration and includes a threaded aperture 75 for receiving the screw 31 and a second much larger aperture or passageway 76 which is counter-sunk to provide a shoulder 77. (See FIGS. 15A, B, C) Extending from the opposite side of the blade mount 15 from the side engaged by the cutting blade 16 is a rectangular extension 78 through which the enlarged passageway 76 passes. Extending through the passageway 76 is a shoulder screw 42 having a hollow body portion 80 sized to be received in the passageway 76 of the blade mount 15. The shoulder screw 42 has an enlarged head 81 which extends through an aperture of the blade 16 and abuts the shoulder 77 of the blade mount 15. The hollow body portion 80 is provided with internal threads 82. A cam follower 43 is threadedly engaged with threads 82.

The blade mount 15 is supported for rotation about axis A—A on a cutting shaft 19, the rotation of which is powered through a driving pulley 5 secured to such cutting shaft 19. Axis A—A is co-axial with the axis A of the neck N when the neck N is gripped by the neck insert members 29. The cutting shaft 19 has welded thereto a radially extending disk 19A (see FIGS. 9 and 13A, B, C). The disk 19A has a U-shaped cut-out portion 19B extending radially inward from its outer periphery and a diagonally extending recess 19C on the side of the disk opposite the cutting shaft 19.

Secured to the disk 19A for rotation therewith is a blade slide retainer 20 (See FIGS. 9, 10, 11 and 14A, B, C). It is secured by means of bolts 46. The blade slide retainer 20 is circular, having a diameter substantially the same as the diameter of the disk 19A welded to the cutting shaft 19. It also has a U-shaped cut-out portion 20A extending radially inward from its outer periphery which has a size substantially the same size as the cut-out portion 19B of the disk 19A. The blade slide retainer 20 is also provided with a diagonally extending recess 20B on the side 21 facing the disk 19A. When the blade slide retainer 20 is secured to the disk 19A, the cut-out portion 20A is aligned with the cut-out portion 19B of the disk 19A and the recess 20B is facing the recess 19C of the disk 19A and cooperates therewith to define a chamber in which a blade slide 14 is positioned. The recess 20B has a central portion 20C which is parallel to side 21 and parallel to the rear surface of the recess 19C of the disk 19A. On opposite sides of the central portion 20C area tapered wall sections 20D which are each disposed at an angle of 45° to the side 21 and to the central portion 20C.

The disk 19A has four threaded apertures 22 to which the bolts 46 may be engaged. Apertures 22 are counter bored for a short distance from the side facing the blade slide retainer 20. The juncture of such counter bores and the remaining portions of the apertures 22 defining shoulders 23.

The blade slide retainer 20 has four apertures 24 which are aligned with the apertures 22 of the disk 19A. In the area facing the disk 19A (i.e. side 21), the apertures 24 have a diameter substantially equal to the counter bore diameters of disk 19A forming the respective shoulders 23. The portions of the apertures 24 adjacent the side opposite the disk 19A are enlarged to receive the enlarged heads 46A of the bolts 46 and cooperate with the smaller portions of such apertures 24 to define radial shoulders 25.

Extending from the enlarged heads 46A of the bolts 46 are central sections 46B having a diameter to be in close sliding engagement with the smaller portion of apertures 24 and the counter bored portion of apertures 22 adjacent shoulders 23. Extending from each of the central sections 46B is a threaded section sized to engage the threaded apertures 22.

Positioned between the enlarged heads 46A of bolts 46 and the shoulders are compressible washers 47 such as Belleville washers or polyurethane washers/o-rings.

The blade slide 14 has an aperture 14A (See FIGS. 9 and 10) through which the shoulder screw 42 extends for supporting the blade slide 14 for movement in the chamber defined by the recesses 20B and 19C. The blade slide 14 also has a U-shaped cut out 14B. The blade slide 14 has a cross sectional configuration generally matching that of the cavity defined by the recesses 19C of the disk 19A and 20B of the blade slide support 20 but one which permits the blade slide 14 to be readily moved longitudinally therein. The blade slide has a pair of surfaces 14C which each are disposed at an angle of 45° to the central portion 20C. Tightening of the bolts 46 against the compressible washers 47 will move the blade slide support 20 toward the disk 19A causing the respective surfaces 14C and 20D to become engaged and to thereby properly center blade slide 14 in the cavity. Engagement of the central sections 46B of the bolts 46 against the respective shoulders 23 ensures against over tightening of blade slide 14 in the cavity through compression of compressible washers 47 which automatically establish the clamping forces.

The blade mount rectangular extension 78 has positioned on opposite sides thereof the U-shaped cut-out portions (1) 19B of the disk 19A, (2) 20A of blade slide retainer 20, and (3) 14B of the blade slide 14 which prevent rotation of the blade mount 15 relative to those elements.

Rotation of driving pulley 5 will subsequently cause rotation of cutting shaft 19 and blade slide retainer 20, blade slide 14, blade mount 15, cutting blade 16 carried thereby and cam follower 43. The cutting shaft 19 is supported by two ball bearings 56 located within the eccentric cam housing 18 and is driven by a second servo motor 61B through driving pulley 5, drive belt 37 and drive pulley 62B.

Means for effecting movement of the blade slide 14 within the chamber defined by the recess 19C of the disk 19A and the recess 20B of the blade slide retainer 20 will now be described. As will be appreciated, sliding of the blade slide 14 within such chamber will cause the cutting blade 16 to be moved inwardly or outwardly relative to the axis A—A and relative to the neck N of the container being trimmed.

Figure 9:
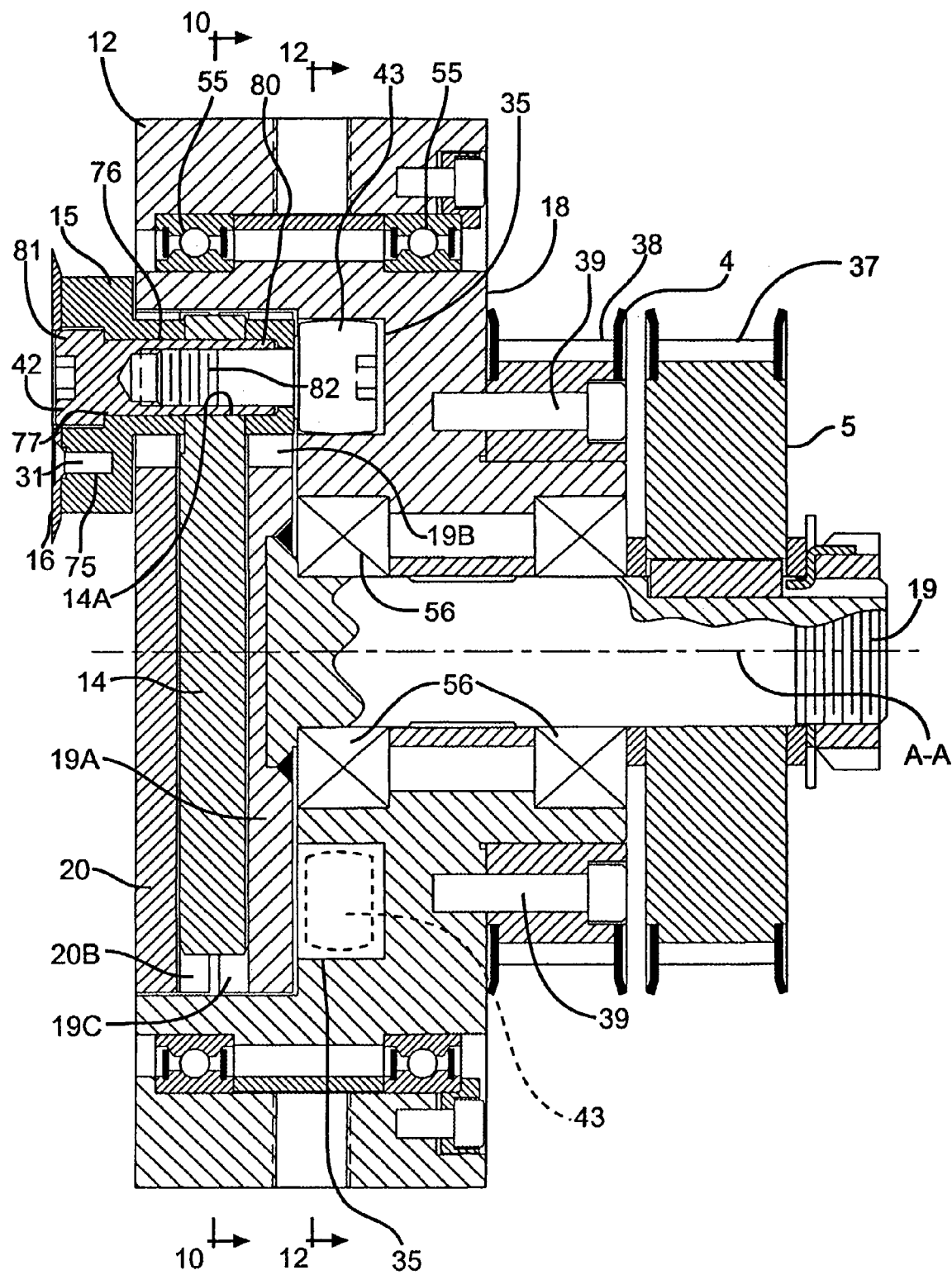
FIG. 9 is an enlarged sectional view showing the cutting knife assembly and the cam assembly.
Figure 10:
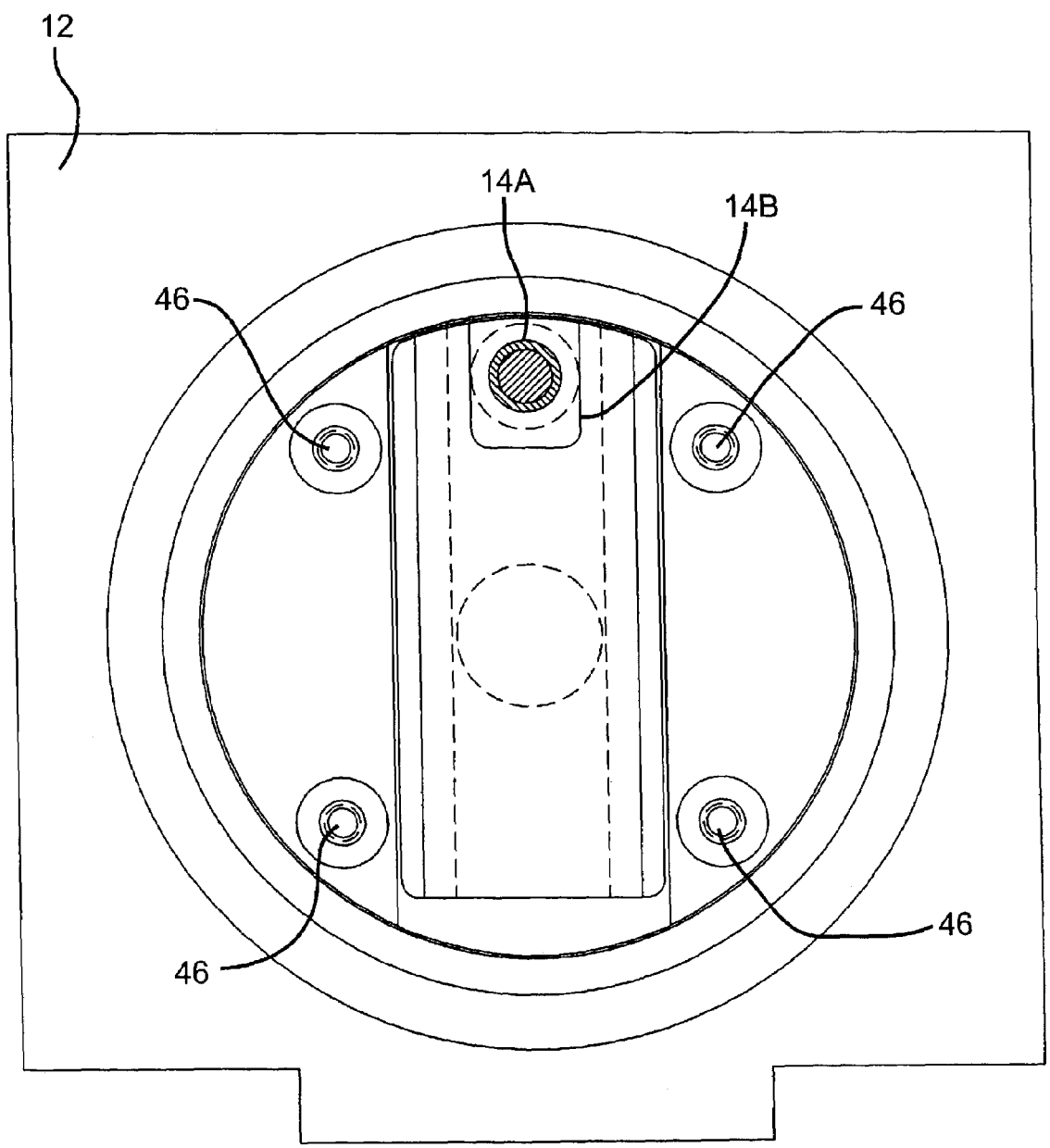
FIG. 10 is a view partially in section taken along line 10—10 of FIG. 9.
Figure 11:
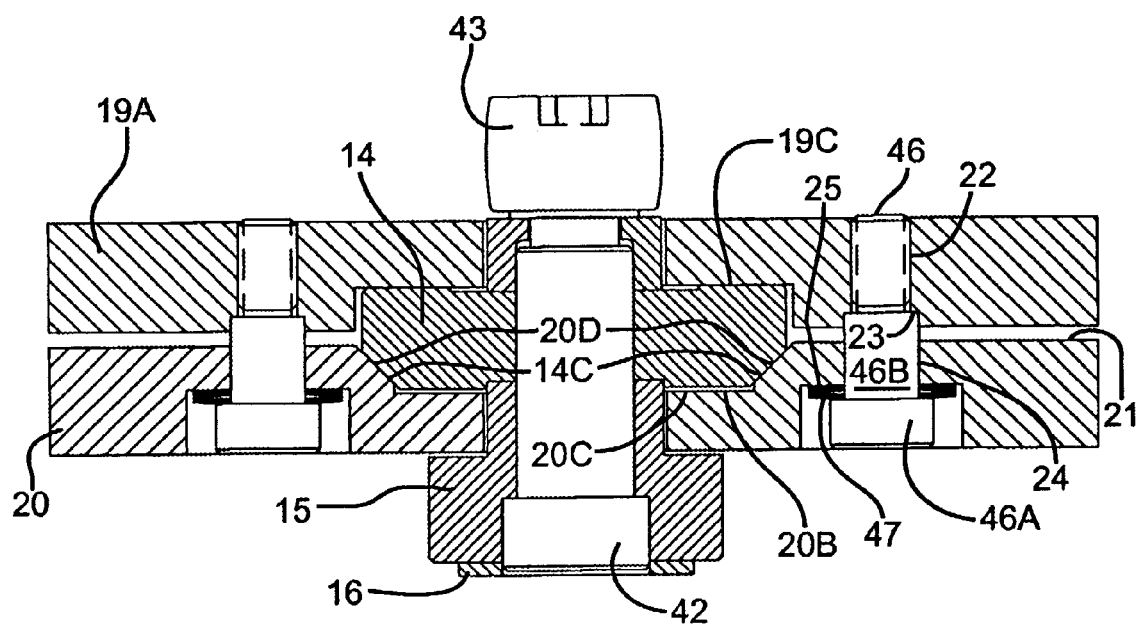
FIG. 11 is a sectional view taken through the cutting blade and support assembly.
Figure 12:
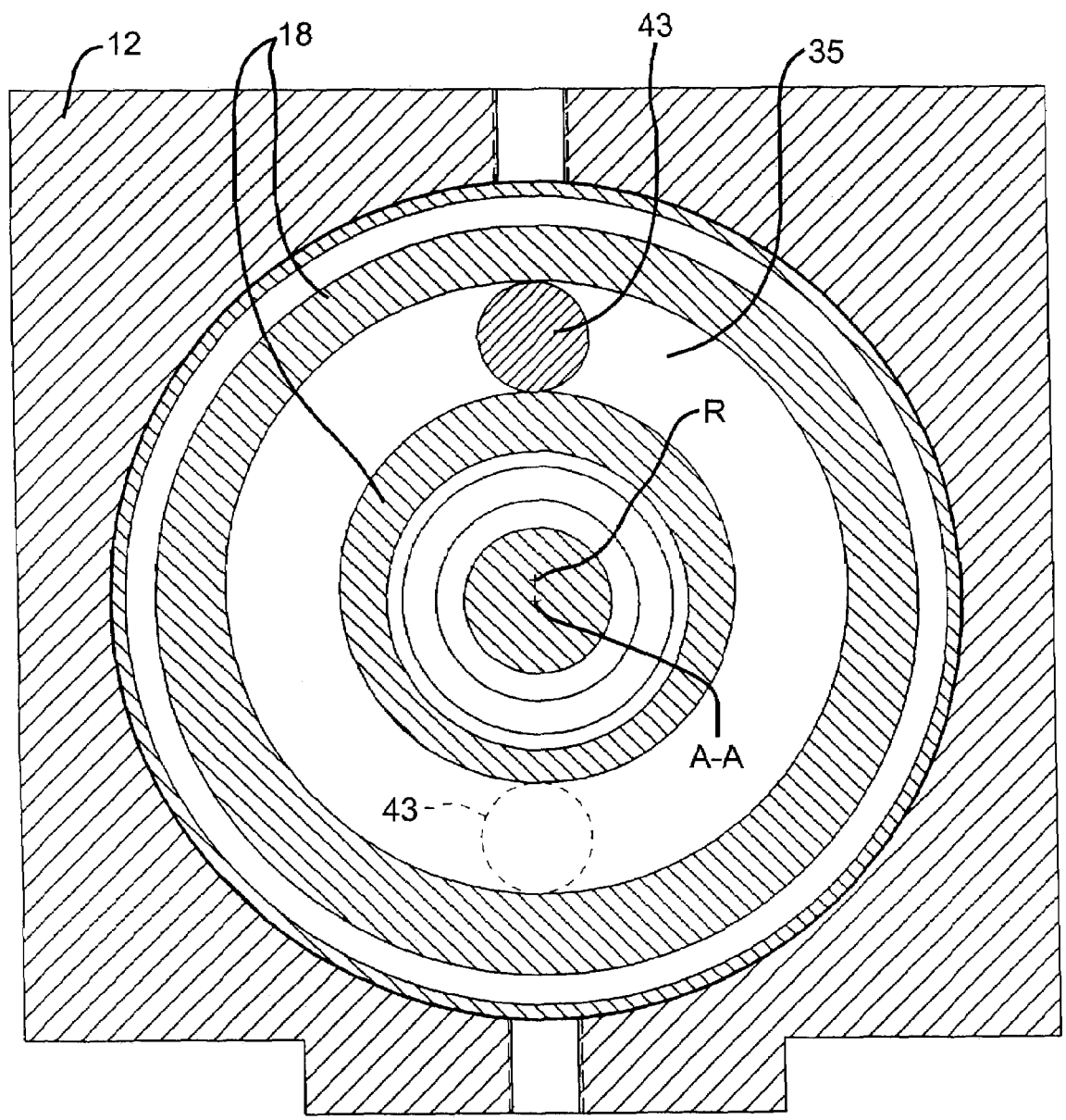
FIG. 12 is a sectional view taken along line 12—12 of FIG. 9.

Referring to FIGS. 9, 10 and 12, the cam housing 18 has a cam groove 35 in which is positioned a cam follower 43 having a shaft extending therefrom secured to threads 82 of the shoulder screw 42 engaged within blade mount 15. The cam groove 35 has a center of radius R (See FIG. 12) which is offset relative to the axis A—A. Rotation of cam housing 18 relative to blade slide retainer 20 and related assembly will cause the cam follower 43 to move in cam groove 35 from the position shown in full lines in FIGS. 9 and 12 to a position in groove 35 180° therefrom shown in phantom lines that is closer to the axis A—A than the position shown in full lines in FIGS. 9 and 12. Such movement of the cam follower 43 closer to the axis A—A causes the blade slide 14 to move in the cavity defined by the recesses 19C and 20B thereby moving the blade slide 14 and related assembly closer to the axis A—A and the cutting blade 16 to and through the wall of the neck N of the container C being trimmed. Such movement of the cutting blade 16 toward the container C causes the cutting blade 16 to rub against the wall 29B of the neck inserts 29 thereby sharpening its cutting edge and polishing the adjacent surface of the cutting blade 16. Rotational movement of the smooth flat surface of the cutting blade 16 on the newly formed finish 2 during cutting of the neck N polishes such finish to a smoothness in the range of less than 15 RMS, μ inches.

The chipless trimmer T of the present invention may be operated in one of a number of alternative methods of operation. The different trimming processes are illustrated in FIGS. 2A–2F which show schematically an incremental blade trimming process with multiple revolutions of the cutting blade 16 around the container neck N, in FIGS. 3A–3F which show schematically a continuous blade trimming process with multiple rotations of the blade around the container neck N and in FIGS. 4A–4D which show a single rotation blade trimming process in which the blade 16 passes around the circumference of the container neck N only a single time.

With respect to the incremental blade trimming process shown schematically in FIGS. 2A–2F, a container C is placed in the cradle 13 with the neck N and the adjacent portion of the body portion B extending away from the edge 13A (see FIG. 8) and positioned between the spaced apart upper and lower container tooling 27, 28 (see FIG. 7). The respective air cylinders 60 are actuated to move the respective upper and lower container tooling 27, 28 toward one another to a closed position firmly gripping the neck N and immediately adjacent portion of the body B, with the waste portion W to be trimmed extending outwardly from the wall surface 29B of the neck insert members 29. The container cradle 13 supporting the container C prior to its engagement by the upper and lower container tooling 27, 28 is so positioned that the center line or axis A of the neck N is approximately 1/16 inch below the axis A—A when the container C is being gripped and supported by the upper and lower container tooling 27, 28. As a result, in its movement upwardly in response to air cylinder 60, the lower container tooling 28 will engage the neck N prior to its engagement by the upper container tooling 27 and begin to lift the container C from the container cradle 13. The container body must be lifted free and clear of any external interferences in order to precisely cut the neck face perpendicular to axis A—A as defined by the upper and lower neck inserts 29 to form a finish 2 which is perpendicular to the axis A of the neck N.

As can be seen in FIG. 7, when the container C is supported by the closed upper and lower container tooling 27, 28, the portion of the container between the neck N and the waste W will be aligned with the cutting blade 16. The servo motor 61B driving the driving pulley 5 through drive belt 37 and the blade housing drive pulley 62B to which the drive belt 37 is also engaged (see FIG. 8) will commence rotation of the cutting blade 16 at a high rate of speed, on the order of 1300 revolutions per minute. The other servo motor 61A is actuated to drive the timing pulley 4 and its associated drive belt 38 and drive pulley 62A to rotate the cam housing 18 thereby imparting relative motion between such cam housing 18 and the cutting blade 16 and its related assembly including the blade mount 15, the blade slide retainer 20 and the blade slide 14. In the incremental blade trimming process illustrated schematically in FIGS. 2A–2F, the operation of the servo motor 61A powering rotation of the cam housing 18 is programmed such that movement of the cam follower 43 in the cam groove 35 will cause the cam follower 43 to initially move in the cam groove 45° relative to its top dead center position, assuming it is desired to utilize four trimming cuts to completely sever the waste W from the neck N. As will be appreciated from viewing FIG. 12, when the cam follower 43 is 180° from its original or top dead center position within the cam groove 35, the cutting blade 16 will have moved downwardly a sufficient distance to completely cut through the thickness of the neck N. As shown in FIG. 12, the original position of the cam follower 43 shown in full lines at the 0° or top dead center position within the cam groove 35 places the cutting blade 16 at its most elevated position and slightly out of contact with the container neck N. When the cam follower 43 has been moved 180° therefrom to the positioned shown in dashed lines in FIG. 12, the cutting blade 16 has been moved downwardly along with the blade slide 14 to a position extending completely through the thickness of the neck N.

Figure 2A:
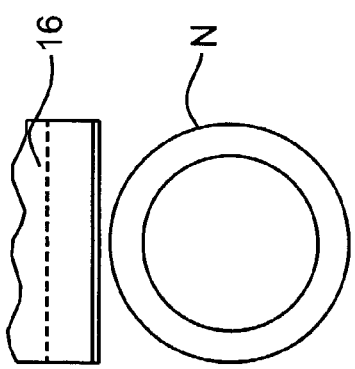
FIGS. 2A–2F show the inter-relationship between the container neck and the cutting blade as the container neck is being cut when utilizing an incremental blade trimming process with multiple revolutions.
Figure 2B:
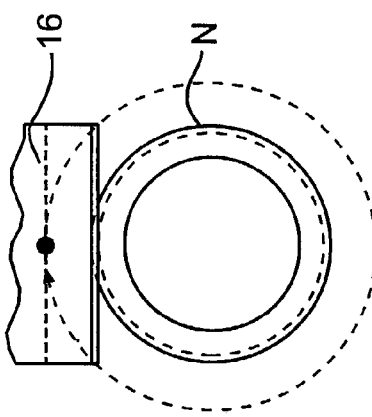
Figure 2C:
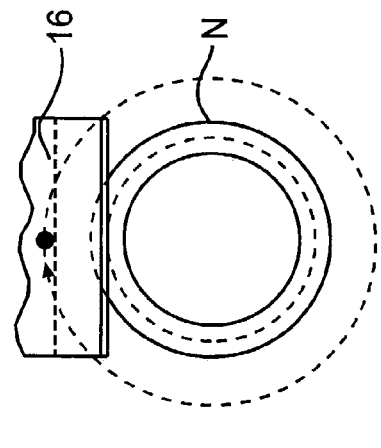
Figure 2D:
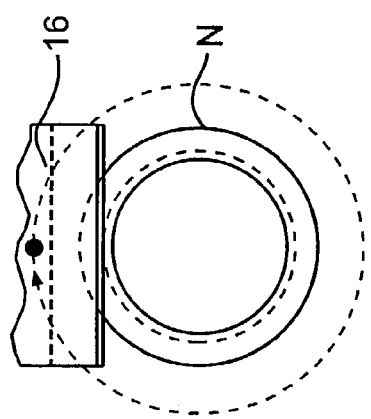
Figure 2E:
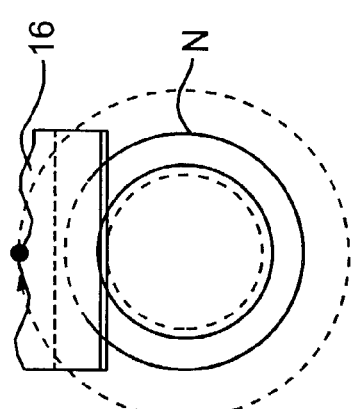
Figure 2F:
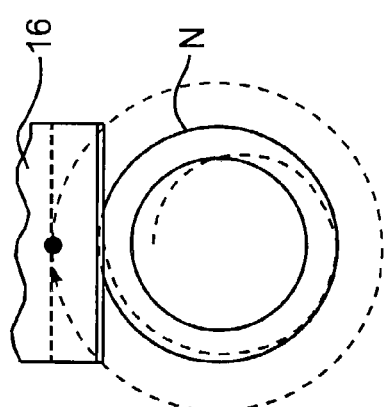
Figure 3A:
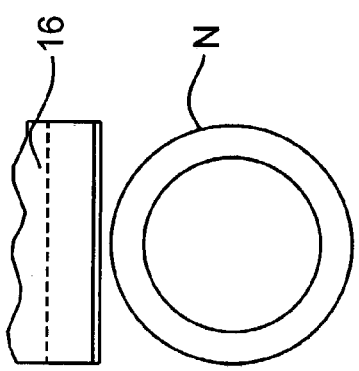
FIGS. 3A–3F show the inter-relationship between the container neck and the cutting blade as the container neck is being cut when utilizing a continuous blade trimming process with multiple revolutions.
Figure 3B:
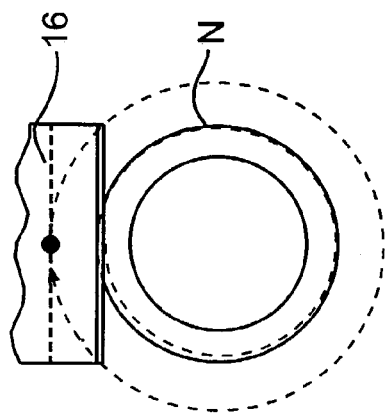
Figure 3C:
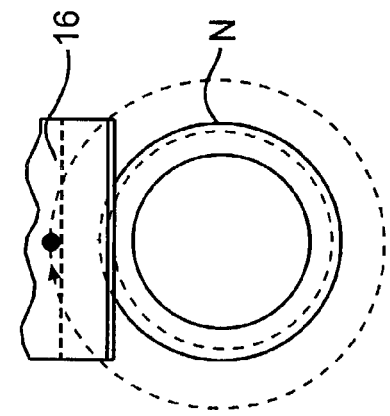
Figure 3D:
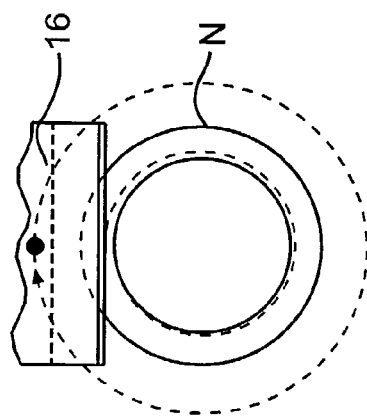
Figure 3E:
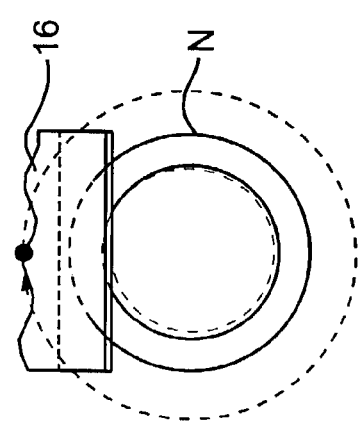
Figure 3F:
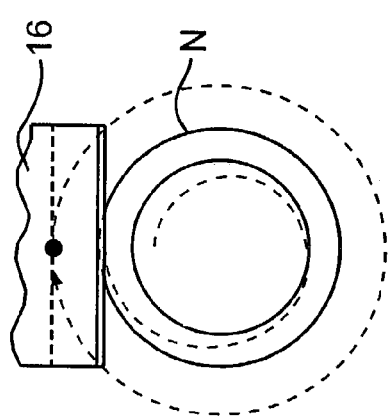
Figure 4A:
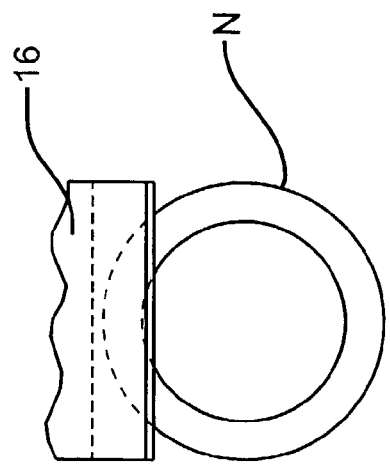
FIGS. 4A–4D show the inter-relationship between the container neck and the cutting blade as the container neck is being cut when utilizing a single rotation blade trimming process.
Figure 4B:
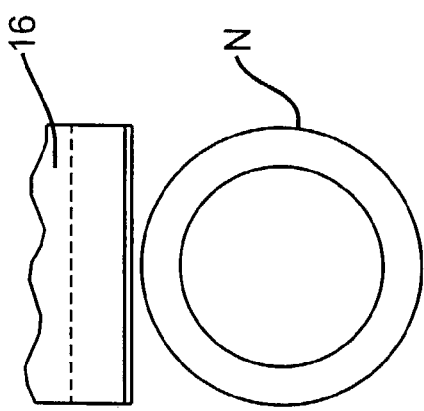
Figure 4C:
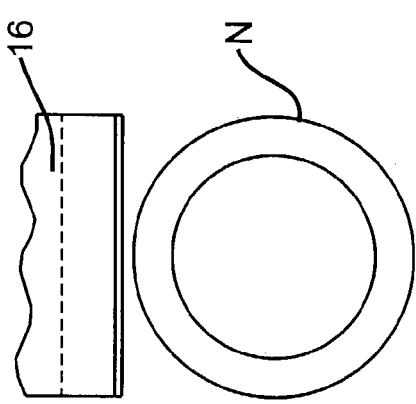
Figure 4D:
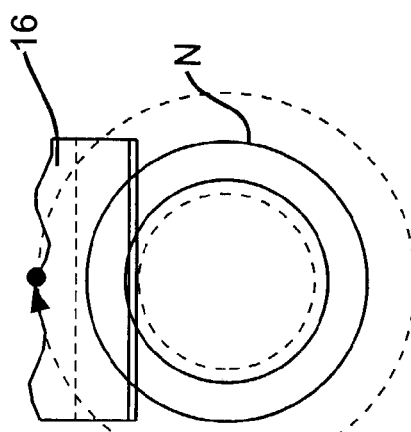
Figure 6:
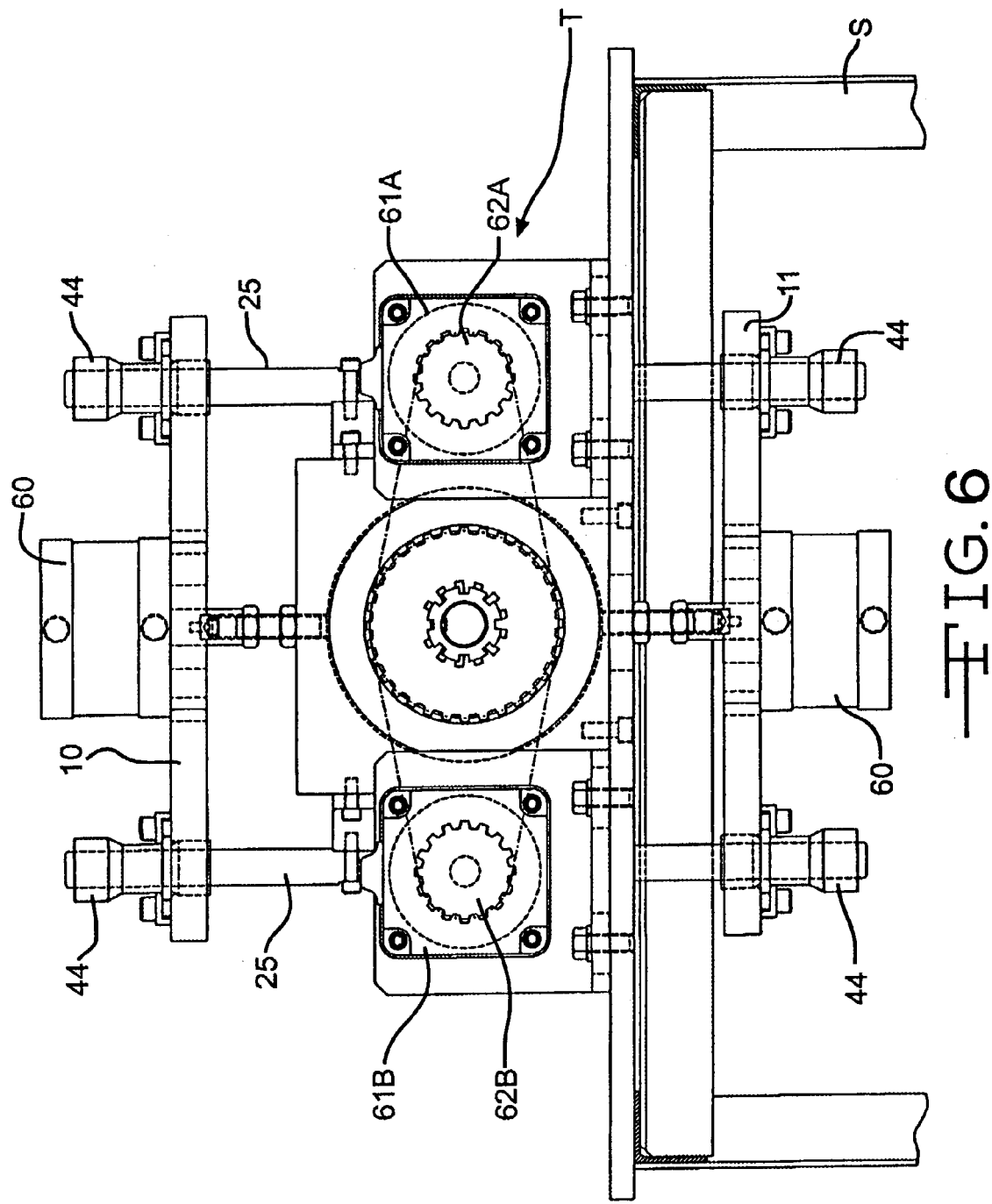
FIG. 6 is a rear elevational view of the trimmer apparatus of the present invention.

As shown in FIG. 2C in order to increase the depth of trimming cut for the second trimming cut, the cam groove will be moved relative to the cam follower 43 to a position 90° from the original 0° position as shown in FIG. 12 as a result of the programming of the servo motor 61. For the third trimming cut, the relative movement positions the cam follower 43 an additional 45° within the cam groove 35 and, for the fourth trimming cut, a further 45° so that the cam follower is 180° relative to its original positioning in the cam groove 35.

Following trimming of the neck N, the cam housing 18 is rotated an additional 180° to place the cam follower 43 back at the 0° or top dead center position as shown in full lines in FIG. 12 thereby withdrawing the blade completely out of alignment with the top of the container neck N. The moil M is completely separated from the neck N when the cam follower 43 reaches the 180° position shown in phantom lines in FIG. 12.

Although the forgoing description has been given with sequential movements of 45° to permit cutting the waste W with four trimming cuts, the servo motor 61A could be programmed to move the cam housing 18 a greater or lesser number of degrees relative to the cam follower 43. For example, if it were desired that the incremental movement utilize 10 revolutions of the blade relative to the depth of the neck, the cam housing 18 would be moved 18° for each cutting sequence. During the eleventh revolution of the cam housing 18, it would rotate 180° relative to the cam follower 43 in order to completely retract the cutting blade from the finished bottle neck end or finish 2.

The surface of the blade 16 adjacent the surface 29B of the upper insert member 29 is polished to a high degree, on the order of 0.5 to 5 rms (root mean square), so that as it rotates relative to the neck N it will polish the cut surface defining neck finish 2 to provide a finish which is especially effective in maintaining a seal with a closure which is secured thereto.

Referring to FIGS. 3A–3F, there is shown schematically the positioning of the cutter blade 16 in the neck N during the various revolutions of a continuous trimming process. Under this embodiment, the movement of the cam housing 18 relative to the cutting blade 16 and its associated assembly is continuous and is timed to effect a cut completely through the thickness of the neck N after four continuous trimming cuts resulting from four revolutions. As will be appreciated, at the end of the fourth trimming cut, the position of the cam follower 43 in the cam groove 35 will be 180° from its original position, namely, at that position shown in phantom lines in FIG. 12. The servo motor 61A is programmed to bring the position of the cam follower 43 to 180° from its original 0° top dead center position shown in solid lines in FIG. 12. The servo motor 61A is then programmed to bring the position of the cam follower 43 back to the 0° top dead center position shown in full lines in FIG. 12 thereby completely withdrawing the blade 16 from the top surface of finish 2 of the neck N.

Referring now to FIGS. 4A–4D, there is shown a single rotation blade trimming process under which the blade 16 is moved completely through the thickness of the neck N so that the neck N has the waste W trimmed therefrom with a single rotation of the blade 16 therearound. This movement of the blade may be effected by rapidly rotating the cam housing 18 relative to the cam follower 43 so that the cam follower 43 reaches the 180° position shown in phantom lines in FIG. 12 so that the waste W is trimmed with a single rotation of the blade 16 relative to the container neck N. The single rotation blade trimming process is faster than the other two processes described and is used where speed is more important than quality of the top surface/finish 2 of the neck N.

Figure 16:
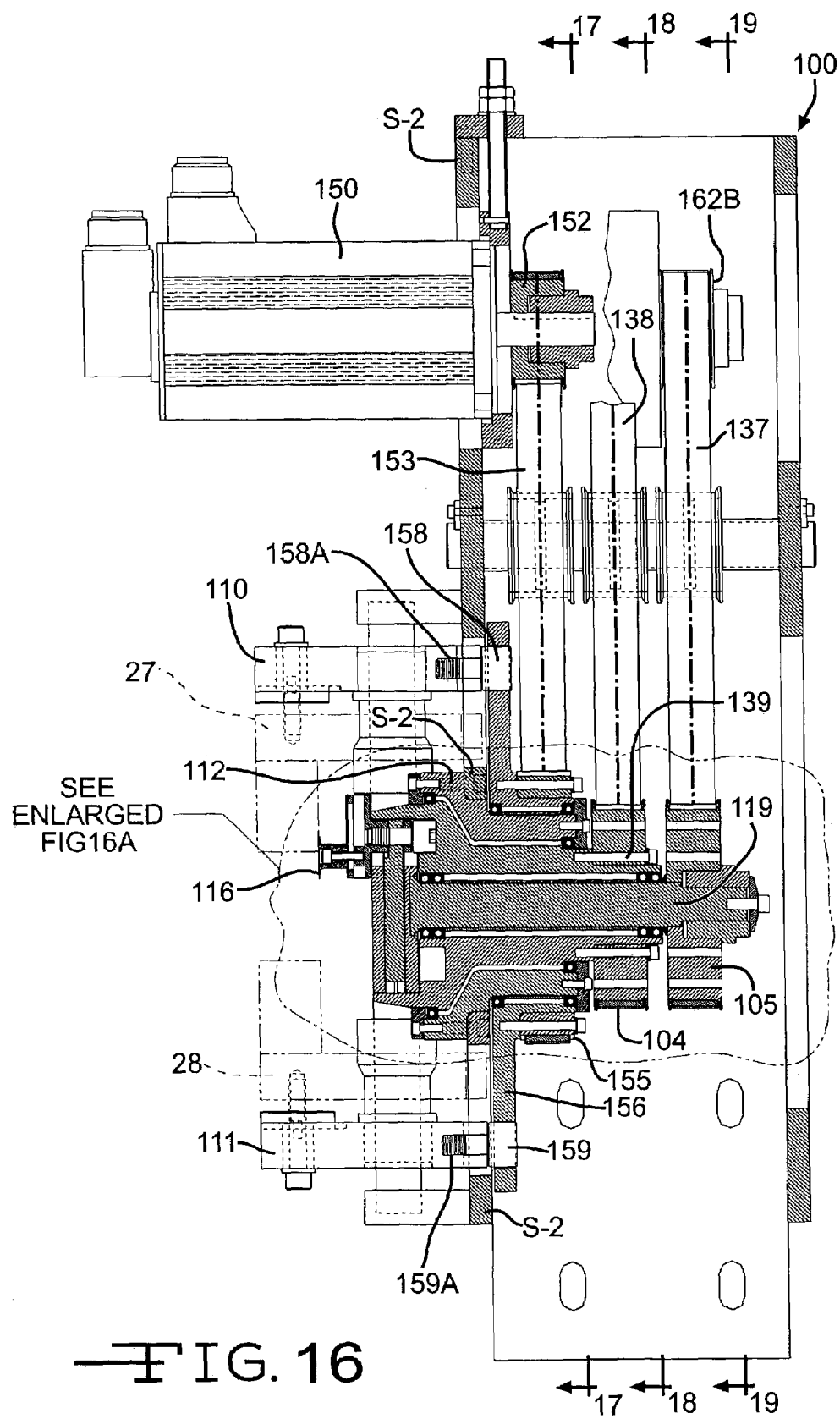
FIG. 16 is a side elevational view, partially in section, of a modified embodiment of the trimmer apparatus.
Figure 29:
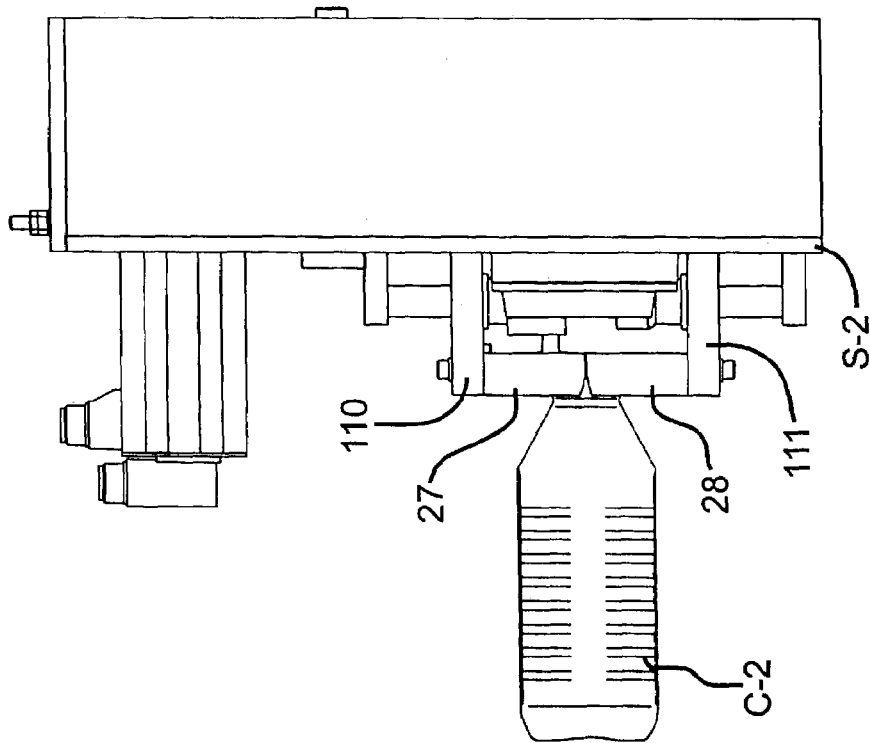
FIGS. 28 and 29 are views similar to, respectively, to FIGS. 26 and 27 but showing the platens and neck inserts in a closed position gripping the bottleneck for the trimming operation.
Figure 28:
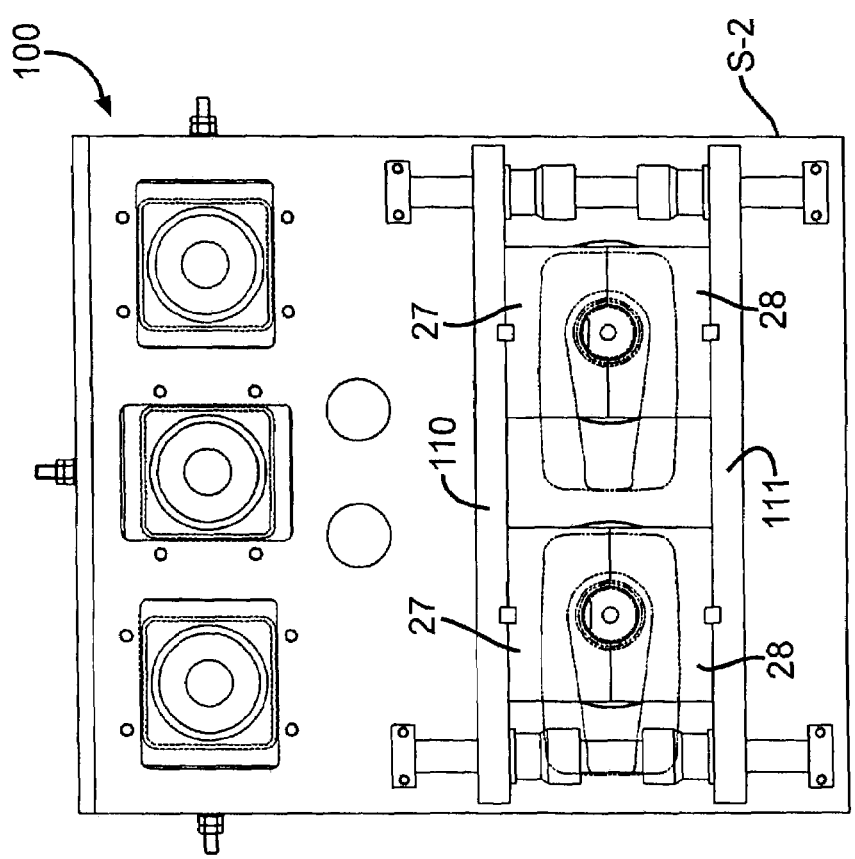

Referring now to FIGS. 16–29, there is shown a modified embodiment of trimming apparatus for trimming multiple bottles, for example 2 or 3 bottles, simultaneously. With reference to FIGS. 16, 16A and 26–29, there is shown trimming apparatus 100 capable of simultaneously trimming two containers C-1 and C-2. The modified trimming apparatus 100 has an upper platen 110 and a lower platen 111 supported on support structure S-2. The upper platen 110 and lower platen 111 support two sets of upper container tooling 27 and two sets of lower container tooling 28 positioned in side-by-side relationship as shown in FIGS. 26 and 28. Actuation of the upper and lower platens 110, 111 from an open position shown in FIGS. 26 and 27 to a closed position as shown in FIGS. 28 and 29 is effected by means of a servo motor 150 rotating a shaft to which is connected a pulley 152 powering movement of a belt 153. As may be seen FIG. 17, the platen actuating belt 153 is looped over idler pulleys 154 and around two spaced apart pulleys 155 which serve to actuate rotation of platen cam members 156, one of which is secured to one of the pulleys 155 and the other of which is secured to the other pulley 155. The platen cam members 156 are each attached to the upper platen 110 by means of a pair of upper cam rollers 158 having the threaded stems 158A and to the lower platen 111 by means of lower cam rollers 159 having threaded stems 159A (see FIG. 16). The cam members 156 each has an upper curved guide slot 160 in which the upper cam rollers 158 are positioned and a lower curved cam slot 161 in which the lower cam rollers 159 are positioned. As can be seen by comparing the location of the platen cam members 156 and the cam rollers 158 and 159 shown in full lines in FIG. 17 with their respective locations shown in phantom lines, the rotation of pulleys 155 by the platen belt 153 causes each of the platen cam members 156 to rotate in a clockwise direction thereby lowering the position of the upper slots 160 and raising the position of the lower slots 161 and carrying with them the respective cam rollers 158 and 159 secured to the upper platen 110 and lower platen 111, respectively, to thereby move the platens 110 and 111 closer together and moving upper and lower container tooling 27 and 28 carried thereby from the open position shown in FIGS. 26 and 27 to the closed position shown in FIGS. 28 and 29.

Mounted on the support structure S-2 is a cutter support housing 112 for supporting the cutter assembly including bottle cutting blade 116 and other portions of the cutting assembly to be hereinafter described. The housing 112 is positioned such that the cutting blade 116 is in contact with the wall 29B of the respective neck insert members 29 attached to the upper container tooling 27 and the lower container tooling 28 previously described. The cutting blade 116 is preferably tool steel which can be polished to a high degree and maintain a sharp cutting edge. As may be seen in FIG. 16B, the cutting blade 116 has a cutting edge E-1 which is shown facing downwardly to trim the waste W from a container C being gripped by the neck insert members previously described. The cutting blade 116 is provided with four cutting edges E-1, E-2, E-3 and E-4 which, as viewed from the front (See FIG. 16B), form a square. The use of four cutting edges prolongs the use of a cutting blade 116 as it permits the cutting blade 116 to be repositioned on the blade mount 115 when one cutting edge, for example E-1, becomes dull and position the cutting blade so that another of the cutting edges, E-2, E-3 or E-4 is facing downwardly to engage and trim the waste W from subsequent containers.

Each of the cutting edges E-1, E-2, E-3 and E-4 follows a straight-line path. The use of a straight-line path for the cutting edges has a number of benefits over cutting edges having other configurations. It maximizes the amount of cutting blade surface which contacts and rubs against the finish 2 being formed during cutting of the waste W and removal of the mail M from the neck N. Such rubbing contact provides a smooth surface for the finish 2, in the range of less than 15 RMS, μ-inches. Obviously, there will be more rubbing contact of the knife 116 against the finish 2 in the embodiment utilizing multiple revolutions. Another benefit of the cutting edges E-1, E-2, E-3 and E-4 following a straight-line path is that, in the embodiment utilizing multiple revolutions, it ensures that the cutting edge E-1 et al. will fall precisely in the groove newly formed during the initial cutting revolutions.

The cutting blade 116 has an integral unitary extension 116A with a central passageway 170 and is adjustably supported on a blade mount 115 by an Allen wrench type screw 171 and nut 172. The blade mount 115 includes a housing 164 and integral unitary rectangular extension 178 having a passageway 176 with threads in an area adjacent the housing 164. A cam follower 143 has a thread stem 174 threadedly engaged to the threads of the passageway 176.

The housing 164 of the blade mount 115 has a hollow central chamber 165 positioned between a front wall 166 and a rear wall 167 from which the extension 178 projects. The front wall 166 has a vertical slot 168 through which the threaded stem of the screw 171 extends. The screw 171 is engaged to the nut 172 which is positioned in the central chamber 165 on the opposite side of the front wall 166 from the extension 116A. Both the extension 116A of the cutting blade 116 and the nut 172 are greater in cross sectional size than the width of the slot 168 and therefore span across the slot 168 to grip opposing sides of the front wall 166 when tightened thereby supporting the cutting blade 116 thereon.

The position of the cutting blade 116, screw 171 and nut 172 along the slot 168 may be adjusted by simply loosening the screw 171 and moving it to another desired location along the slot 168. Such adjustment is made when containers being trimmed are changed from ones having one neck size to one having a smaller or larger neck size. The trimmer can trim containers having necks ranging in nominal size from 28 to 68 millimeters but is not limited in its size range.

Figure 16A:
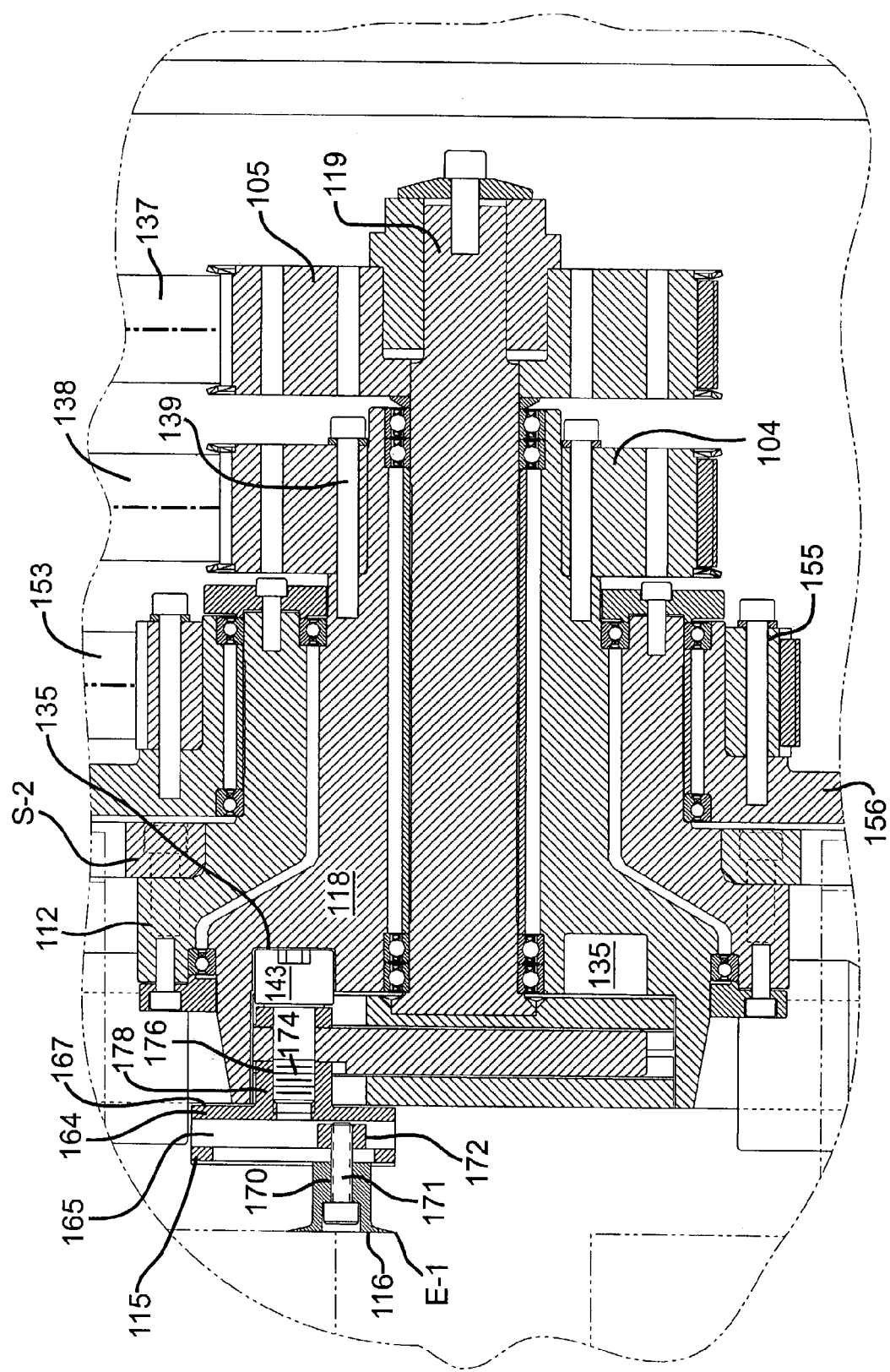
FIG. 16A is a sectional view of an enlarged section of FIG. 16.
Figure 16B:
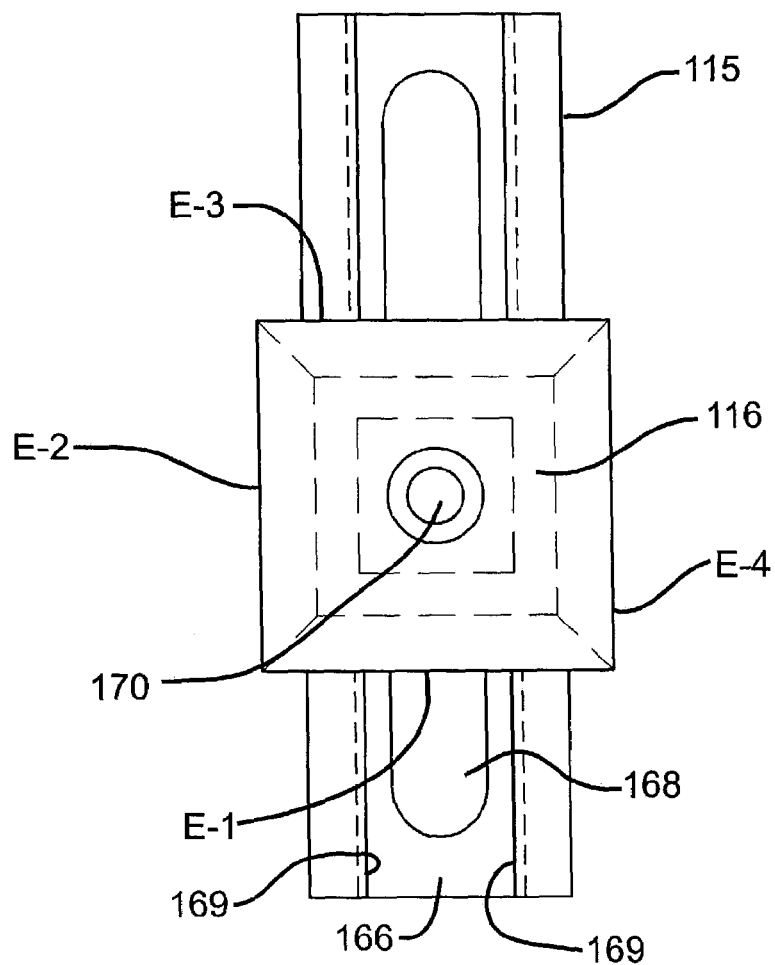
FIG. 16B is a front elevational view of the blade mount with the blade positioned therein.
Figure 16C:
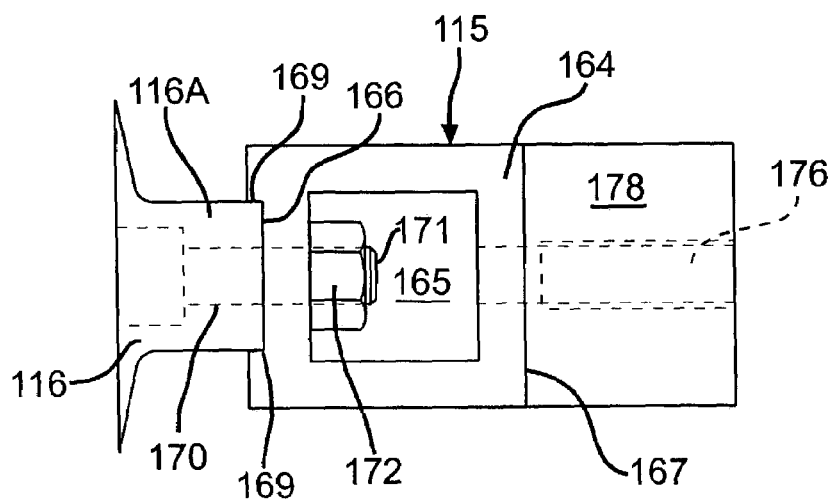
FIG. 16C is a top view of the blade mount with the blade positioned therein.
Figure 17:
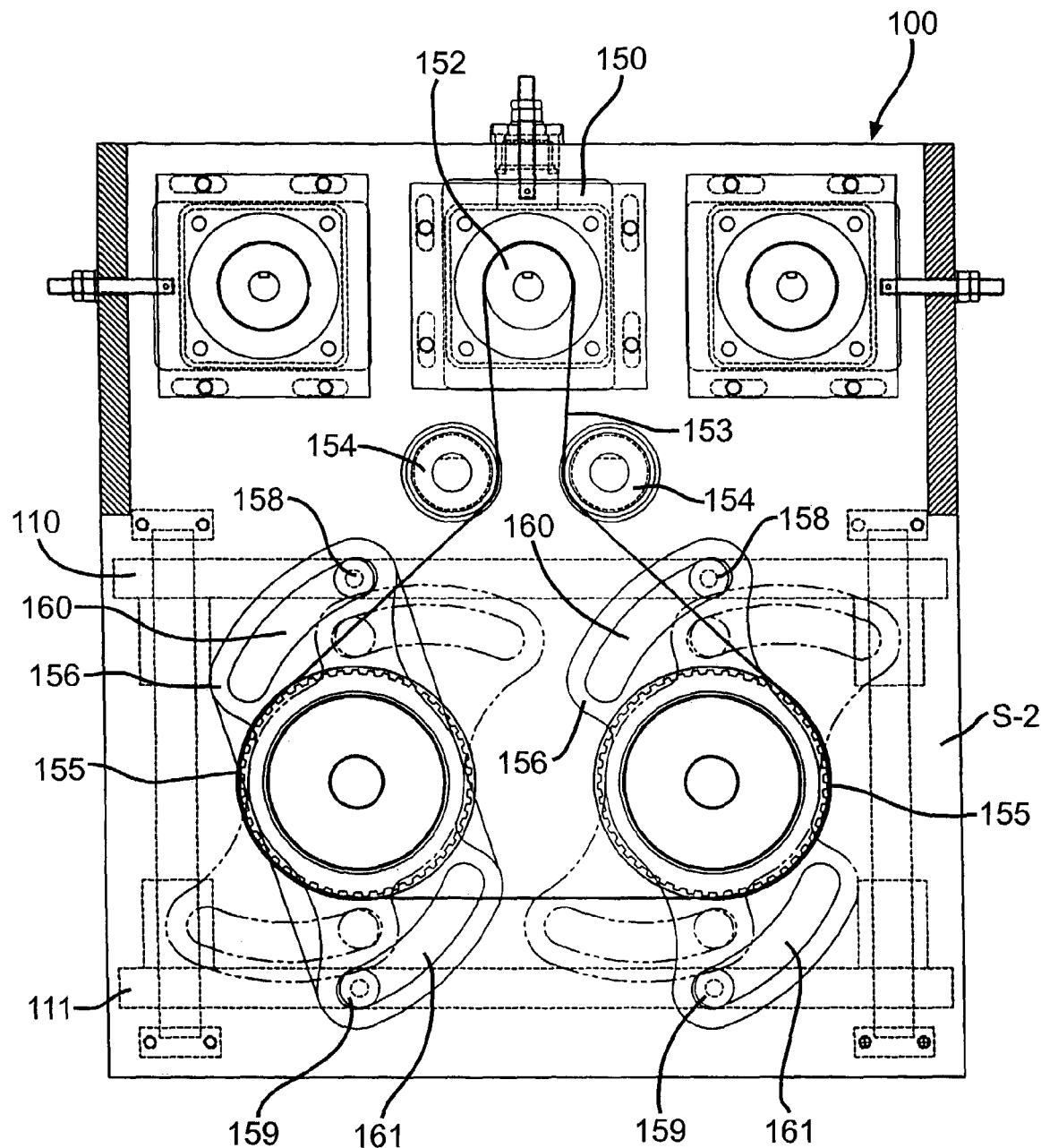
FIG. 17 is a view taken through line 17—17 of FIG. 16.

As can be seen in FIGS. 16A, 16B and 16C, the central portion of the front wall 166 is recessed to provide a pair of opposing shoulders 169 which are spaced apart a distance to snugly receive the integral unitary extension 116A and prevent the cutting blade 116 from rotating relative to the housing 164.

Positioned within the cutter support housing 112 for rotation relative thereto is a cam shaft 118. Radial bearings 185 permit rotation of the cam shaft 118 relative to the cutter support housing 112. Rotation of the cam shaft 118 is effected by means of a timing pulley 104 secured to the cam shaft 118 by bolts 139. A drive belt 138 powers rotation of the timing pulley 104. The drive belt 138 is powered by a servo motor 161A having a drive pulley 162A over which the drive belt 138 is passed. As can be seen in FIGS. 18 and 26–29, under the present embodiment two containers C-1 and C-2 are being trimmed simultaneously with two cutting blades 116 and related assembly. Accordingly, the belt 138 is trained over two timing pulleys 104.

Figure 18:
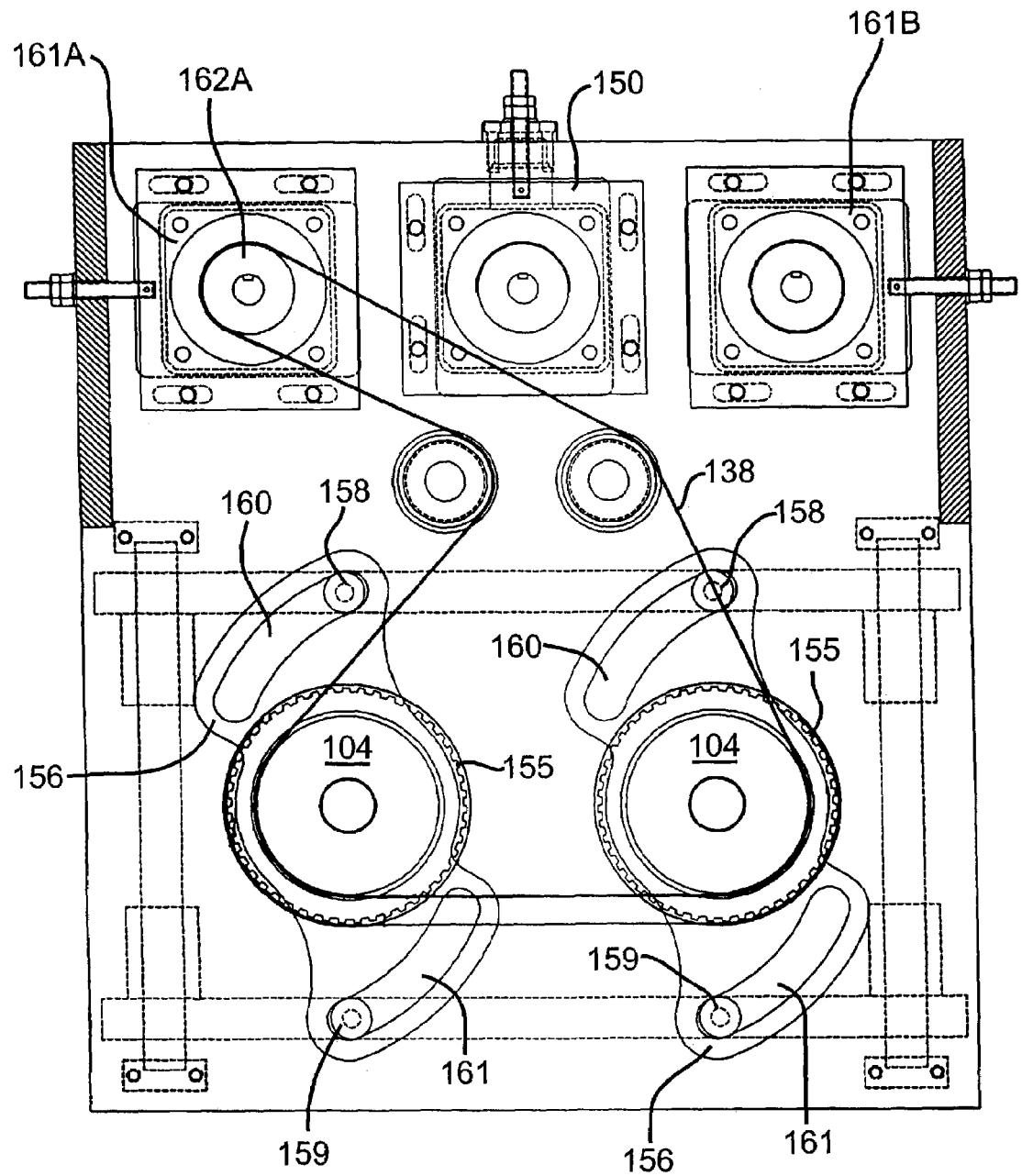
FIG. 18 is a view taken through line 18—18 of FIG. 16.

Referring to FIGS. 16 and 18, there is shown mechanism for moving the cutting head assembly including the housing 164 and the cutting blade 116 supported thereon from the raised position out of engagement with the bottle neck N supported by the closed upper and lower container tooling 27 and 28 and their respective neck insert members 29 to lowered positions progressively penetrating through the thickness of the neck N as previously described with respect to the embodiment of FIGS. 1–15. The view of FIG. 18 taken along line 18—18 of FIG. 16 shows the cam plates 156 and the cam rollers 158 and 159 previously described. With the closed container tooling 27, 28 supporting respectively the two containers C-1 and C-2 to be trimmed, the servo motor 161A is actuated to rotate the drive pulley 162A and thereby the two timing pulleys 104 to position the cam shaft in the rotationally desired position between the top dead center 0° position in which the cutting edges E-1 of the blades 116 are out of contact with the container necks to the 180° position at which the cutting edges E-1 have been moved completely through the thickness of the walls of the necks N of the containers C-1 and C-2. Such rotational movement moves the cam roller 143 relative to the cam groove 135. As previously discussed, this motion from the 0° top dead center position to the 180° position could be continuous or intermittent at a series of angular shifts, for example, rotational movements of 45° each. Following cutting of the necks, there is a rapid continuous rotational movement of cam shafts 118 from the 180° position to the 0° top dead center position to thereby withdraw the cutting blades 116 away from the respective newly cut necks N and in position to receive and cut the next containers C-1 and C-2.

Figure 19:
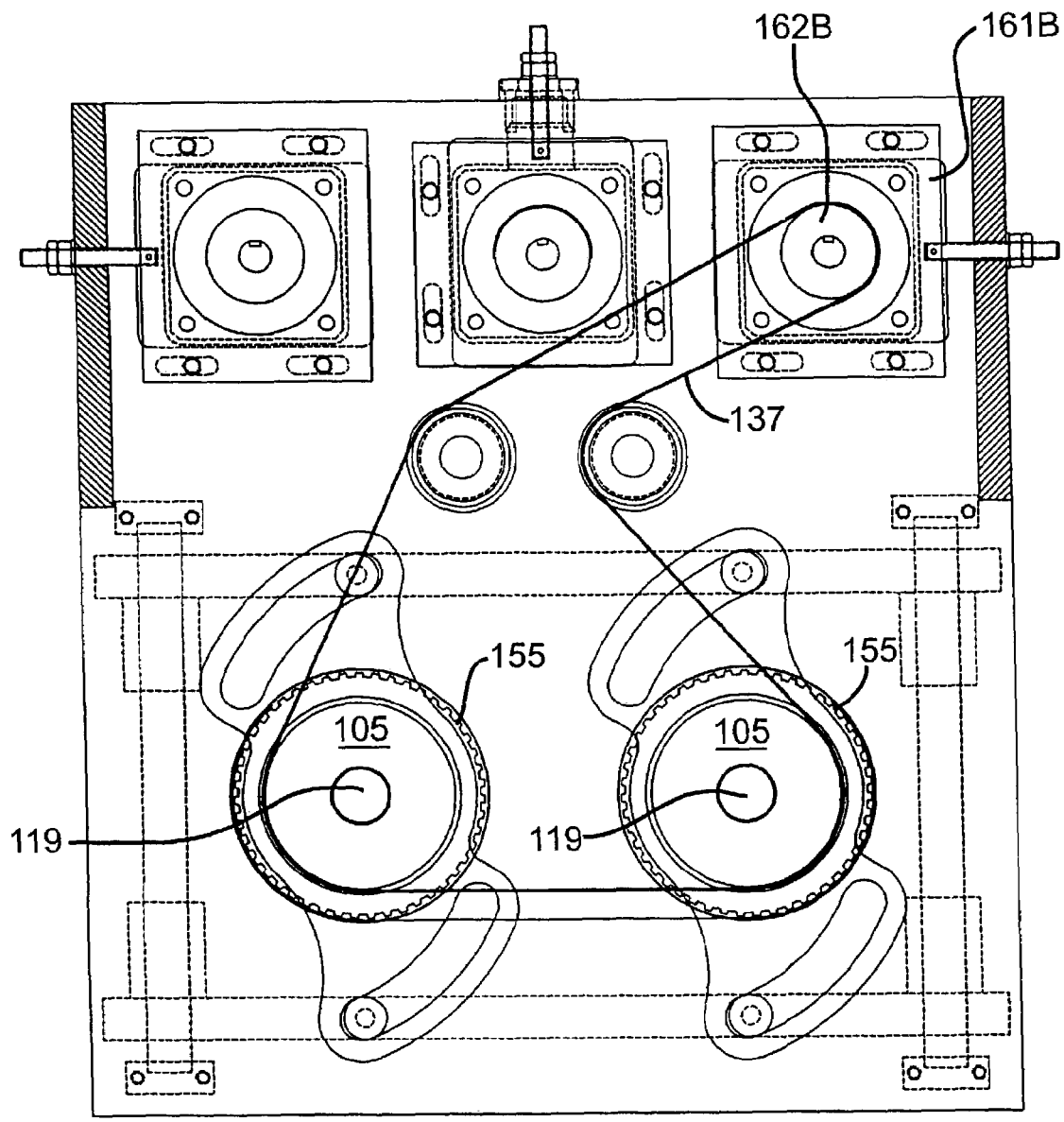
FIG. 19 is a view taken through line 19—19 of FIG. 16.

Rotation of the cutting blades 116 rapidly around necks N being cut is performed as cutting blades 116 are being moved inwardly, either continuously or intermittently, by rotation of cam rollers 143 in their respective cam grooves 135. Rotation of the cutting blades 116 is powered by means of a third servo motor 161B as shown in FIG. 19. The servo motor 161B powers a drive pulley 162B over which is trained a drive belt 137 which passes around idler rollers and over a pair of driven pulleys 105, one powering rotation of the one of the cutting shafts 119 and the other powering rotation of the other cutting shaft 119. As will be appreciated, operation of the servo motor 161B is coordinated with that of servo motor 161A such that servo motor 161B is rotating the cutting shaft 119 and the knife 116 around the container neck N while the servo motor 161A is causing the knife to be moved inwardly through the wall thickness of the neck.

Figure 20:
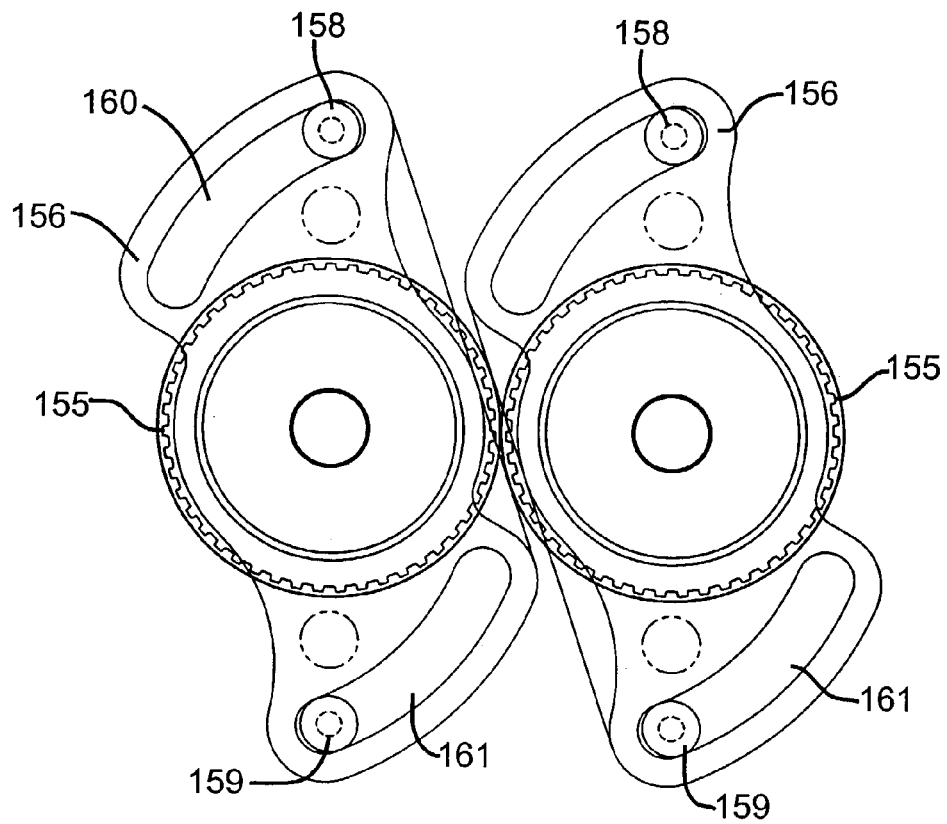
FIG. 20 is a view showing the relationship of the cams controlling movement of the platens when the platens are fully open showing two heads on 6 inch, center-to-center spacing.
Figure 21:
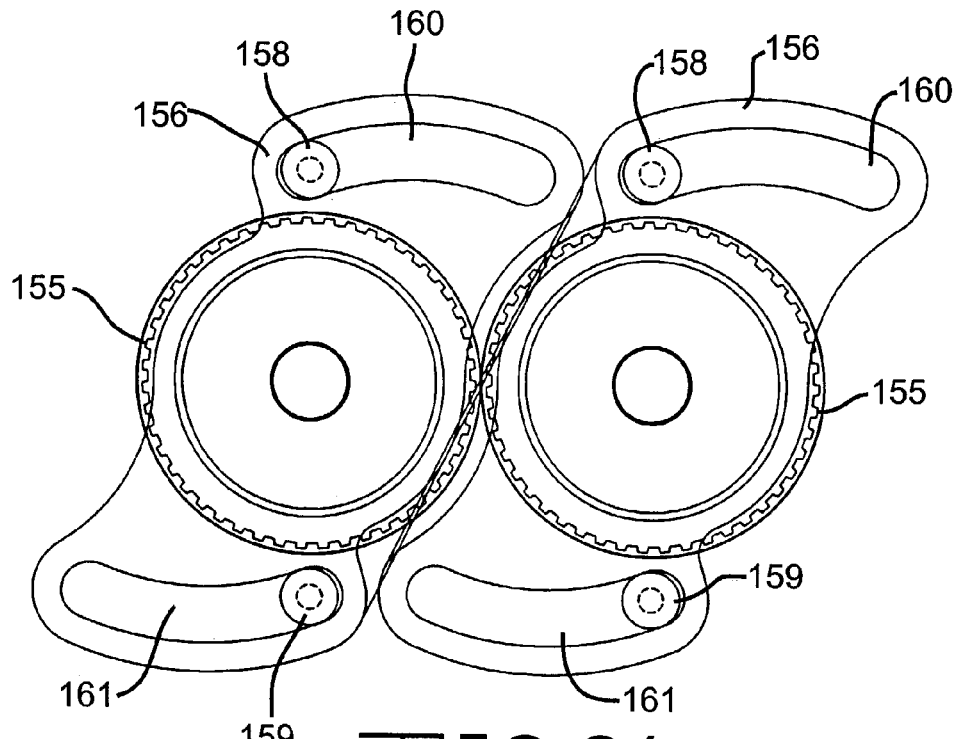
FIG. 21 is a view similar to FIG. 20 with the platens fully closed.

It is within the contemplation of the present invention to provide apparatus which can simultaneously cut two, three or even more containers simultaneously and to cut containers of widely varying sizes. FIGS. 20–25 show schematically some of the variations contemplated with respect to numbers of containers simultaneously trimmed and spacing for various sizes of containers. Each of these figures shows cam plates 156 and their respective positioning for various sized containers. FIG. 21 shows the cam plates 156 and related pulleys 155 for use in opening and closing the upper and lower container tooling 27, 28 and neck insert members 29 for cutting apparatus having two cutting heads spaced apart 6 inches center-to-center. FIG. 20 shows the position of the cam plates 156 and cam rollers 158 when the platens 110, 111 are in their most spaced apart position with the neck insert members open while FIG. 21 shows the relative position following rotation of the pulleys 155 and cam plates 156 to move the cam rollers 158 to the opposite end of the respective slots 160, 161 to the closed position of the neck insert members.

Figure 22:
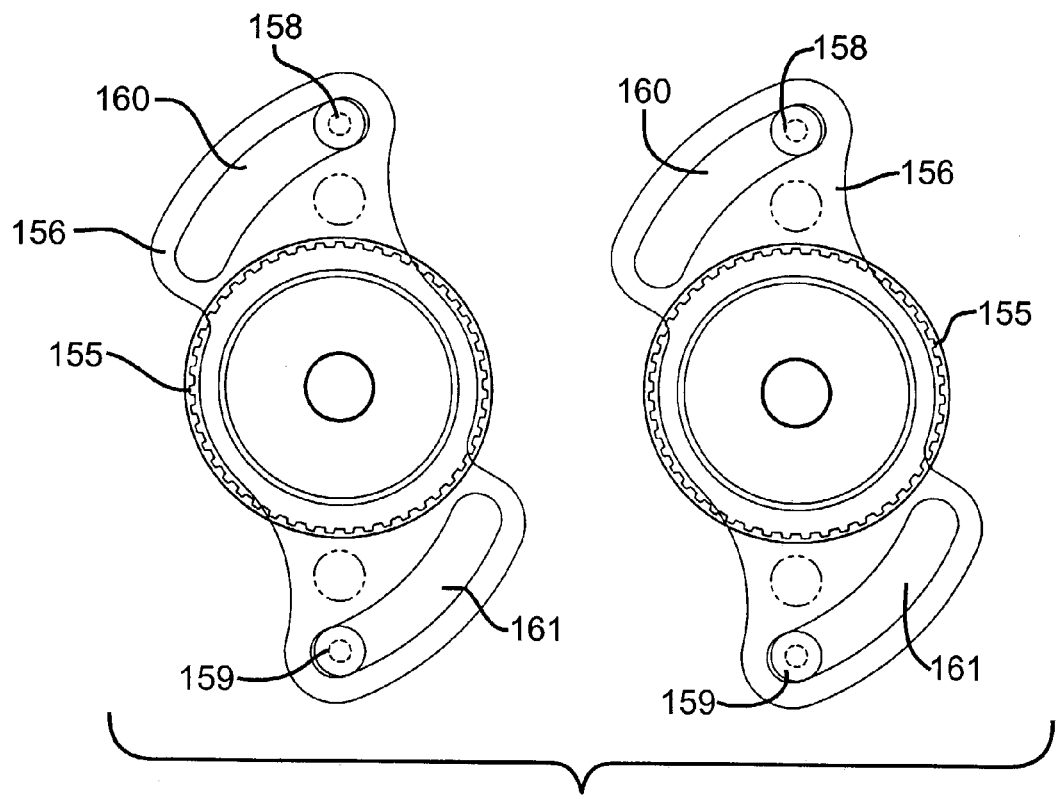
FIGS. 22 and 23 are views similar to FIGS. 20 and 21, respectively, but showing the inter-relationship of the cams utilizing two heads on 9 inch, center-to-center spacing.
Figure 23:
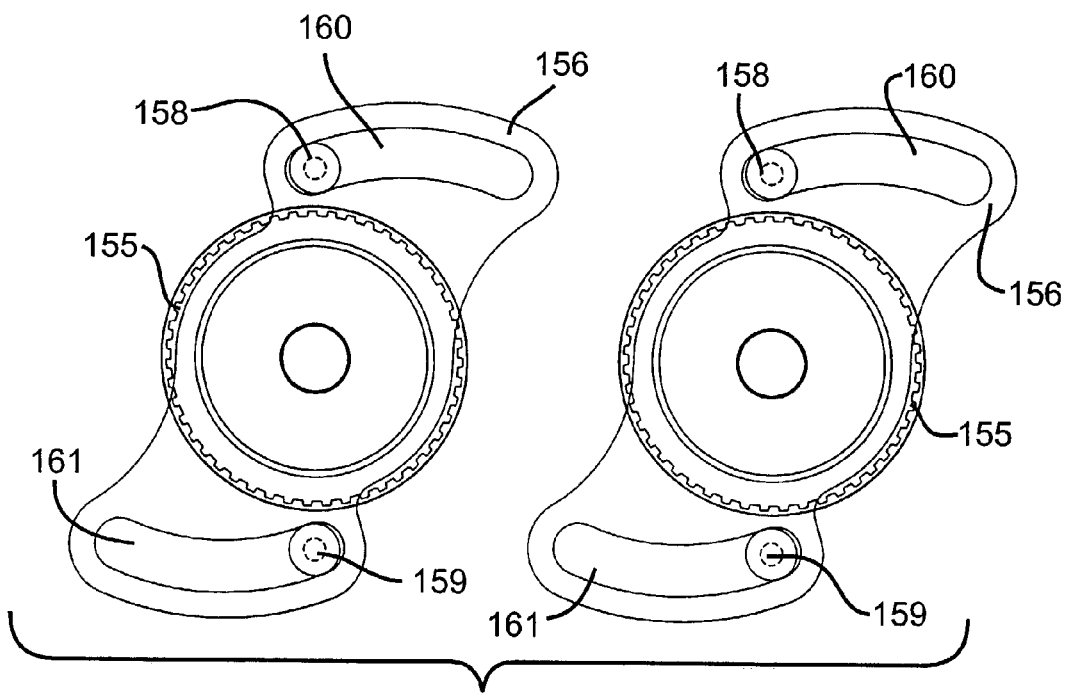

FIGS. 22 and 23 are views similar to FIGS. 20 and 21, respectively, but showing the positions for cutting apparatus having two heads spaced apart nine inches center-to-center which would be appropriate for cutting larger bottles than could be accommodated by cutting apparatus having six inch center-to-center spacing depicted in FIGS. 20 and 21.

Figure 24:
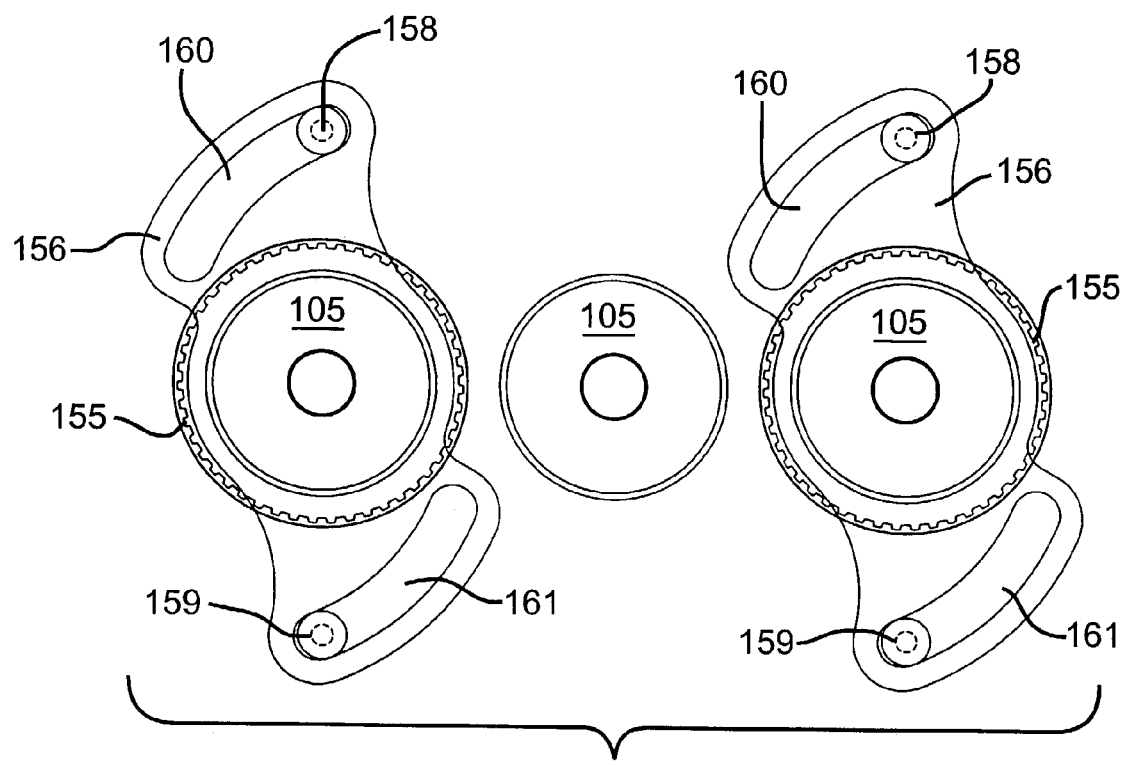
FIGS. 24 and 25 are views similar to FIGS. 20 and 21 but showing the inter-relationship of the cams on an apparatus utilizing three cutting heads on 6 inch, center-to-center spacing.
Figure 25:
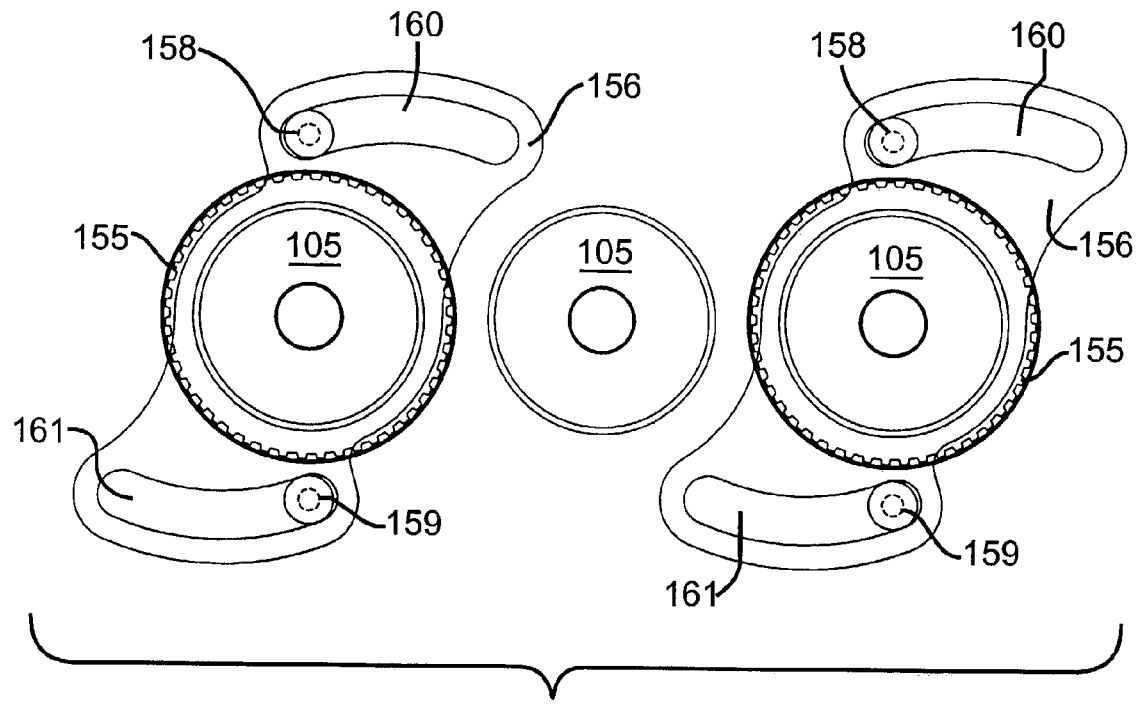
Figure 27:
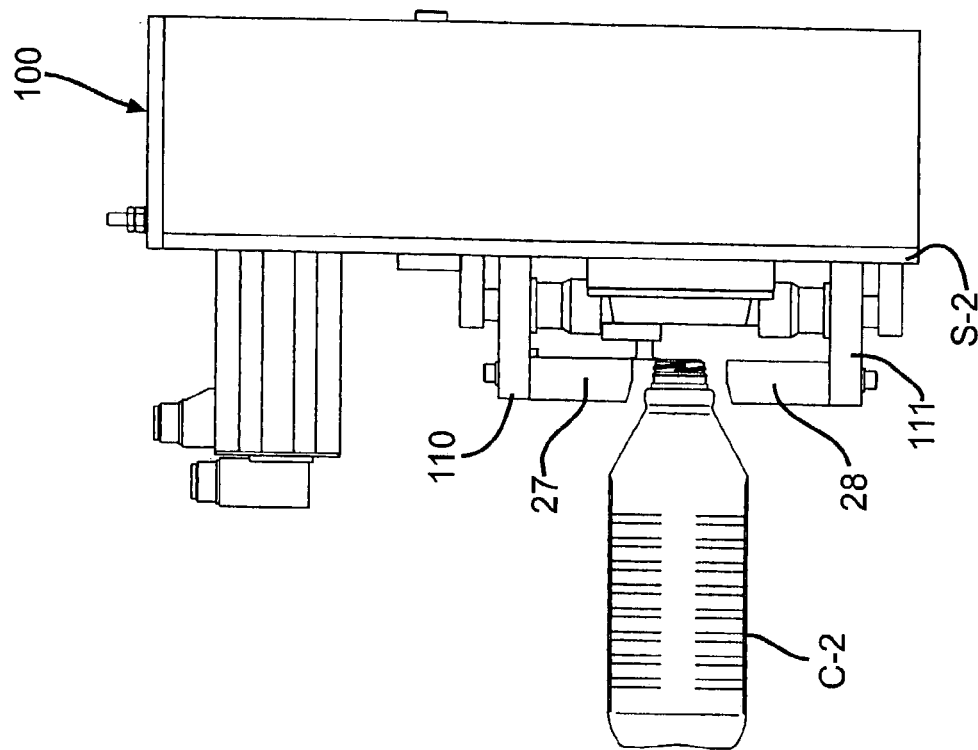
FIG. 27 is a side elevational view of FIG. 26.
Figure 26:
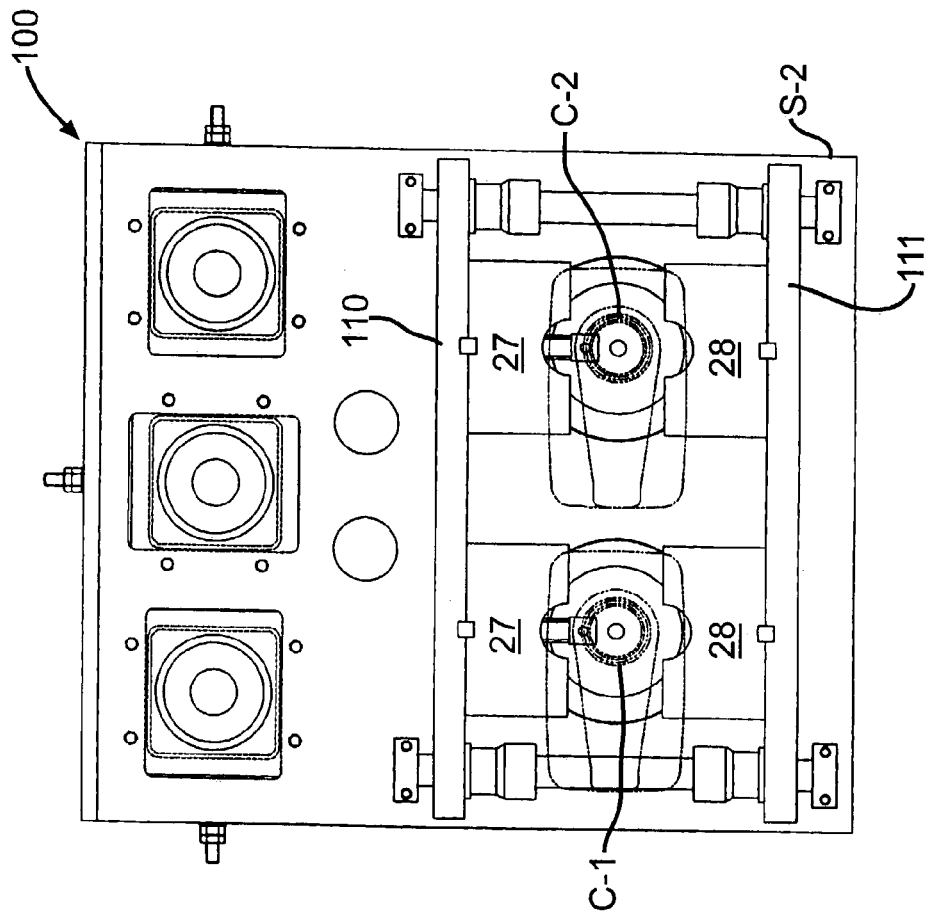
FIG. 26 is a front elevational view showing a machine with two cutting heads with bottles to be trimmed positioned between open platens and neck insert members.

FIGS. 24 and 25 are views similar to FIGS. 20 and 21, respectively, but showing the spacing for cutting apparatus having three cutting heads spaced apart six inches center-to-center. It will be noted that even though there are three cutting heads for the embodiment of FIGS. 24 and 25, it is necessary to only utilize two cam plates 156 for opening and closing the platens 110 and 111. There will, of course, be three driven pulleys 105, one for each cutting head, three timing pulleys (not shown) and related apparatus.

Many modifications will become readily apparent to those skilled in the art. Accordingly, the scope of the present patent application should be viewed only by the scope of the claims appended hereto.

We claim:

1. A method for trimming waste plastic from the neck of a plastic bottle, said neck having an inner surface and an outer surface, said outer surface defining a closed loop extending around an axis, comprising the steps of:
   (a) providing a tool having a cutting edge;
   (b) engaging said cutting edge against said outer surface;
   (c) moving said cutting edge around said outer surface; and said neck to (i) move said cutting edge around said closed loop and (ii) move said cutting edge toward said inner surface; and
   (d) interconnecting a cam with said tool, said cam controlling the depth of positioning of said cutting edge between said outer surface and said inner surface.

2. A method for trimming waste plastic from the neck of a plastic bottle, said neck having an inner surface and an outer surface, said outer surface defining a closed loon extending around an axis, comprising the steps of:
- (a) providing a tool having a cutting edge and a planar surface extending from said cutting edge;
- (b) gripping said neck below said waste plastic;
- (c) engaging said cutting edge against said outer surface;
- (d) imparting relative movement between said cutting edge and said neck to (i) move said cutting edge around said closed loop and (ii) move said cutting edge progressively closer to said inner surface as it moves around said closed loop;
- (e) causing said cutting edge to make multiple revolutions around said closed loop prior to said cutting edge reaching said inner surface; and
- (f) forming a substantially flat surface perpendicular to said axis during steps (d) and (e); and
- (g) imparting relative movement between said planar surface and said flat surface to polish said flat surface.

3. A method for trimming waste from the upper portion of a plastic bottle having outwardly facing closure engagement means adjacent the area to be trimmed, said area having an inner surface and an outer surface, said outer surface defining a circular or other closed loop path extending around an axis, comprising the steps of:
- (a) gripping said closure engagement means with a gripping mechanism;
- (b) providing a tool having a cutting edge and a planar surface;
- (c) imparting relative movement between said cutting edge and said area to (i) move said cutting edge into engagement with said outer surface around said closed loop path and (ii) move said cutting edge toward said inner surface;
- (d) causing said cutting edge to make multiple revolutions around said closed loop prior to said cutting edge reaching said inner surface;
- (e) forming a substantially flat surface perpendicular to said axis during steps (c) and (d) and causing said planar surface to make multiple revolutions around said closed loop while in contact with said flat surface to polish said flat surface.

4. A method for trimming waste from the upper portion of a plastic bottle having outwardly facing closure engagement means adjacent the area to be trimmed, said area having an inner surface and an outer surface, said outer surface defining a circular or other closed loop path extending around an axis, comprising the steps of:
- (a) gripping said closure engagement means with a gripping mechanism;
- (b) providing a tool having a cutting edge;
- (c) imparting relative movement between said cutting edge and said area to (i) move said cutting edge into engagement with said outer surface around said closed loop path and (ii) move said cutting edge toward said inner surface; and
- (d) interconnecting a cam with said tool, said cam controlling the depth of positioning of said cutting edge between said outer surface and said inner surface.

5. Apparatus for trimming waste from the neck portions of plastic bottles to form a surface defining a finish thereon, said neck portions having inner and outer surfaces extending around an axis comprising
- (a) a neck gripper movable between an open and a closed position for engaging and supporting said neck portions, said neck gripper, when closed around one of said neck portions, defining an axis co-axial with said neck portion axis and having an engagement surface substantially perpendicular to said axis;
- (b) a cutting blade movable in sliding engagement with said neck gripper engagement surface (i) toward and away from said axis and (ii) circumferentially around said axis;
- (c) a cutting blade support for supporting said cutting blade, said support being rotatable around said axis along with said cutting blade; and
- (d) a cam mechanism for moving said cutting blade toward said axis and away from said axis.

6. Apparatus according to claim 5 wherein said cam mechanism has a cam slot and said cutting blade support has a cam positioned and movable in said slot and means for moving said cam follower slot relatively to said cam follower while said cutting blade support is rotating around said axis.

7. Apparatus according to claim 5 wherein said cam mechanism has a circular cam slot lying on a second axis offset from the axis defined by said neck gripper when closed and further including means for rotating said cam slot relative to said cam follower while said cutting blade support is rotated around said supported neck portion.

8. Apparatus according to claim 7 further including means for rotating said cutting blade support comprising a rotatable shaft extending along said neck gripper axis, a disk extending radially outwardly from said shaft, a blade slide retainer facing said disk and cooperating therewith to define a space, a blade slide positioned in said space, said blade slide secured to said cutting blade support and transmitting rotational movement of said shaft to said cutting blade support, said blade slide being movable in said space to accommodate movement of said cutting blade support and said cutting blade toward and away from said axis upon movement of said cam slot relative to said cam follower.

9. Apparatus according to claim 8 wherein said disk includes a recessed surface substantially perpendicular to said neck gripper axis and defining one side of said space and said blade slide retainer includes a recess defining an opposing side of said space, said retainer recess including a pair of tapered surfaces, each disposed at angle in the range of 40° to 50° relative to said disk recessed surface, said blade slide having a first side with one or more surfaces facing and substantially parallel to said disk recessed surface and a second side facing said blade slide retainer, said second side having tapered surfaces mating with said retainer tapered surfaces.

10. Apparatus according to claim 9 wherein said blade slide retainer includes a central wall surface positioned between said retainer tapered surfaces, and said blade slide has an intermediate wall surface between said second side tapered surfaces, said intermediate wall surface being spaced from said blade slide retainer surface.

11. Apparatus according to claim 10 further including engagement members securing said blade slide retainer to said disk and resiliently compressible washers associated with said engagement members to control the amount of pressure between said second side tapered surfaces and said retainer tapered surfaces and to maintain contact therebetween notwithstanding wear occurring thereon.

12. Apparatus according to claim 8 wherein there is provided multiple ones of said neck gripper cutting blade, cutting blade support, cam mechanism and rotatable shaft and wherein each said neck gripper includes an upper portion and a lower portion and further including an upper platen supporting each of said neck gripper upper portions and a lower platen supporting each of said neck gripper lower portions, at least one cam plate having an upper cam slot and a lower cam slot, an upper cam roller secured to said upper platen and positioned in said upper cam slot for movement relative thereto, a lower cam roller secured to said lower platen and positioned in said lower cam slot for movement relative thereto, said upper and lower cam slots configured to permit movement thereof relative to the respective upper and lower cam roller positioned therein upon rotation of said cam plate, said rotation in one direction moving said platens closer together and in the opposite direction moving said platens further apart and means for rotating said cam plate.

13. Apparatus according to claim 5 wherein said cam mechanism moves said cutting blade toward said axis on a continuous basis until said cutting blade passes through said inner wall surface.

14. Apparatus according to claim 5 wherein said cam mechanism moves said cutting blade intermittently toward said axis until said cutting blade passes through said inner wall surface.

15. Apparatus according to claim 6 wherein said cutting blade has at least one cutting edge following a straight-line path, said cutting edge being sharpened upon the sliding engagement of said cutting blade with said neck gripper engagement surface.

16. Apparatus according to claim 5 wherein cutting blade has a plurality of cutting edges, said cutting blade being adjustable on said cutting blade support to vary which of said cutting edges to cut said neck portions.

17. Apparatus according to claim 6 wherein said cutting blade support includes an adjustment mechanism permitting adjustment of said cutting blade relative to said axis to accommodate the cutting of neck portions of varying sizes said adjustment mechanism including a housing supported on said cutting blade support, said housing having a slot extending along a longitudinal axis perpendicular to said neck gripper axis and engagement means extending through said slot for supporting said knife on said housing at multiple locations along said slot.

18. Apparatus for trimming waste from the neck portions of plastic bottles to form a surface defining a finish thereon, said neck portions having inner and outer surfaces extending around an axis comprising
 (a) a neck gripper movable between an open and a closed position for engaging and supporting said neck portions, said neck gripper, when closed around one of said neck portions, defining an axis co-axial with said neck portion axis;
 (b) a cutting blade movable (i) toward and away from said axis and (ii) circumferentially around said axis;
 (c) a cutting blade support for supporting said cutting blade, said support being rotatable around said axis along with said cutting blade; and
 (d) a cam mechanism for moving said cutting blade toward said axis and away from said axis.

19. Apparatus according to claim 18 wherein said cam mechanism has a cam slot and said cutting blade support has a cam positioned and movable in said slot and means for moving said cam follower slot relatively to said cam follower while said cutting blade support is rotating around said axis.

20. Apparatus according to claim 18 wherein said cam mechanism has a circular cam slot lying on a second axis offset from the axis defined by said neck gripper when closed and further including means for rotating said cam slot relative to said cam follower while said cutting blade support is rotated around said supported neck portions.

21. Apparatus according to claim 20 further including means for rotating said cutting blade support comprising a rotatable shaft extending along said neck gripper axis, a disk extending radially outwardly from said shaft, a blade slide retainer facing said disk and cooperating therewith to define a space, a blade slide positioned in said space, said blade slide secured to said cutting blade support and transmitting rotational movement of said shaft to said cutting blade support, said blade slide being movable in said space to accommodate movement of said cutting blade support and said cutting blade toward and away from said axis upon movement of said cam slot relative to said cam.

22. Apparatus according to claim 21 wherein said disk includes a recessed surface substantially perpendicular to said neck gripper axis and defining one side of said space and said blade slide retainer includes a recess defining an opposing side of said space, said retainer recess including a pair of tapered surfaces, each disposed at angle in the range of 40° to 50° relative to said disk recessed surface, said blade slide having a first side with one or more surfaces facing and substantially parallel to said disk recessed surface and a second side facing said blade slide retainer, said second side having tapered surfaces mating with said retainer tapered surfaces.

23. Apparatus according to claim 22 wherein said blade slide retainer includes a central wall surface positioned between said retainer tapered surfaces, and said blade slide has an intermediate wall surface between said second side tapered surfaces, said intermediate wall surface being spaced from said blade slide retainer surface.

24. Apparatus according to claim 23 further including engagement members securing said blade slide retainer to said disk and resiliently compressible washers associated with said engagement members to control the amount of pressure between said second side tapered surfaces and said retainer tapered surfaces and to maintain contact therebetween notwithstanding wear occurring thereon.

25. Apparatus according to claim 21 wherein there is provided multiple ones of said neck gripper cutting blade, cutting blade support, cam mechanism and rotatable shaft and wherein each said neck gripper includes an upper portion and a lower portion and further including an upper platen supporting each of said neck gripper upper portions and a lower platen supporting each of said neck gripper lower portions, at least one cam plate having an upper cam slot and a lower cam slot, an upper cam roller secured to said upper platen and positioned in said upper cam slot for movement relative thereto, a lower cam roller secured to said lower platen and positioned in said lower cam slot for movement relative thereto, said upper and lower cam slots configured to permit movement thereof relative to the respective upper and lower cam roller positioned therein upon rotation of said cam plate, said rotation in one direction moving said platens closer together and in the opposite direction moving said platens further apart and means for rotating said cam plate.

26. Apparatus according to claim 18 wherein said cam mechanism moves said cutting blade toward said axis on a continuous basis until said cutting blade passes through said inner wall surface.

27. Apparatus according to claim 18 wherein said cam mechanism moves said cutting blade intermittently toward said axis until said cutting blade passes through said inner wall surface.

28. Apparatus according to claim 18 wherein said cutting blade has at least one cutting edge following a straight-line path.

29. Apparatus according to claim 18 wherein cutting blade has a plurality of cutting edges, said cutting blade being adjustable on said cutting blade support to vary which of said cutting edges to cut said neck portions.

30. Apparatus of claim 19 wherein said cutting blade support includes an adjustment mechanism permitting adjustment of said cutting blade relative to said axis to accommodate the cutting of neck portions of varying sizes said adjustment mechanism including a housing supported on said cutting blade support, said housing having a slot extending along a longitudinal axis perpendicular to said neck gripper axis and engagement means extending through said slot for supporting said knife on said housing at multiple locations along said slot.

31. The method according to claim 2 wherein said flat surface is polished to a smoothness of 15 RMs, μ inches or less.

32. The method according to claim 3 wherein said flat surface is polished to a smoothness of 15 RMs, μ inches or less.

* * * * *

UNITED STATES PATENT AND TRADEMARK OFFICE
CERTIFICATE OF CORRECTION

| | |
|---|---|
| PATENT NO. | : 7,093,525 B2 |
| APPLICATION NO. | : 10/422004 |
| DATED | : August 22, 2006 |
| INVENTOR(S) | : Proffitt et al. |

It is certified that error appears in the above-identified patent and that said Letters Patent is hereby corrected as shown below:

Column 13, line 1, please replace "loon" with -- loop --.

Signed and Sealed this

Seventh Day of November, 2006

JON W. DUDAS
*Director of the United States Patent and Trademark Office*